(12) United States Patent
Fang et al.

(10) Patent No.: US 12,540,995 B2
(45) Date of Patent: Feb. 3, 2026

(54) METHODS AND SYSTEMS FOR CALIBRATING MEDICAL DEVICES

(71) Applicant: SHANGHAI UNITED IMAGING HEALTHCARE CO., LTD., Shanghai (CN)

(72) Inventors: Xiangbin Fang, Shanghai (CN); Can Liao, Shanghai (CN); Tuota Xing, Shanghai (CN); Feichao Fu, Shanghai (CN)

(73) Assignee: SHANGHAI UNITED IMAGING HEALTHCARE CO., LTD., Shnaghai (CN)

( * ) Notice: Subject to any disclaimer, the term of this patent is extended or adjusted under 35 U.S.C. 154(b) by 173 days.

(21) Appl. No.: 18/434,786

(22) Filed: Feb. 6, 2024

(65) Prior Publication Data

US 2024/0272259 A1 Aug. 15, 2024

(30) Foreign Application Priority Data

Feb. 11, 2023 (CN) .......................... 202310108901.1
Feb. 11, 2023 (CN) .......................... 202320187874.7

(51) Int. Cl.
*G01R 33/58* (2006.01)
*A61B 5/055* (2006.01)
*G01R 33/565* (2006.01)

(52) U.S. Cl.
CPC ............ *G01R 33/583* (2013.01); *A61B 5/055* (2013.01); *G01R 33/56518* (2013.01); *A61B 2560/0223* (2013.01)

(58) Field of Classification Search
CPC ............ G01R 33/583; G01R 33/56518; G01R 33/4808; G01R 33/56572; G01R 33/58; A61B 5/055; A61B 2560/0223
See application file for complete search history.

(56) References Cited

FOREIGN PATENT DOCUMENTS

CN 105158712 A * 12/2015

OTHER PUBLICATIONS

Machine translation of cited foreign patent publication CN-105158712-A (Year: 2015).*

* cited by examiner

*Primary Examiner* — G.M. A Hyder
(74) *Attorney, Agent, or Firm* — METIS IP LLC

(57) ABSTRACT

A method for calibrating a medical device is provided. The medical device may include a magnetic resonance (MR) device. The method may include switching a gradient field in at least one gradient direction of the MR device; obtaining a magnetic flux variation in the at least one gradient direction in at least one portion of a spatial region within a gradient field domain of the MR device using a magnetic flux measurement component; determining a center of the gradient field domain of the MR device based on the magnetic flux variation; and performing a mechanical adjustment on the MR device to locate the center of the gradient field domain at a target position based on the center of the gradient field domain, or adjusting an image reconstruction process to correct or eliminate an impact of inaccuracy of the center of the gradient field domain on a reconstructed image.

20 Claims, 23 Drawing Sheets

300

- 310: Switching a gradient field in at least one gradient direction of an MR device
- 320: Obtaining, by using a magnetic flux measurement component, a magnetic flux variation in the at least one gradient direction in at least one portion of a spatial region within a gradient field domain of the MR device
- 330: Determining, based on the magnetic flux variation, a center of the gradient field domain of the MR device
- 340: Performing, based on the center of the gradient field domain, a mechanical adjustment on the MR device to locate the center of the gradient field domain at a target position
- 350: Adjusting, based on the center of the gradient field domain, an image reconstruction process performed on data generated by the MR device to correct or eliminate an impact of inaccuracy of the center of the gradient field domain on an image reconstructed based on the data

FIG. 3

1210
1220
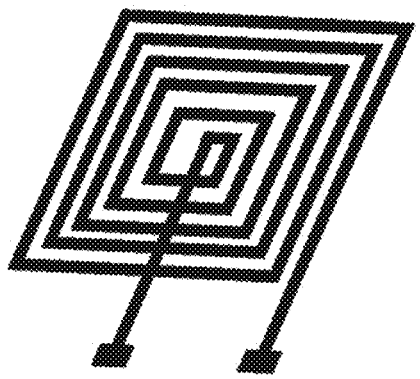
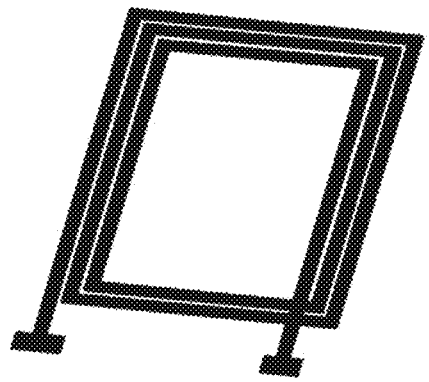
1230
1240
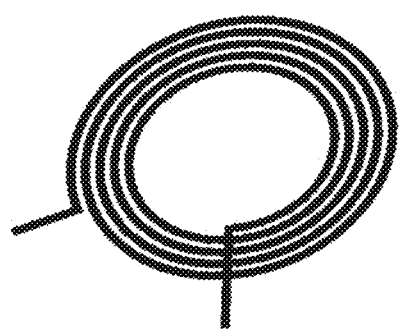
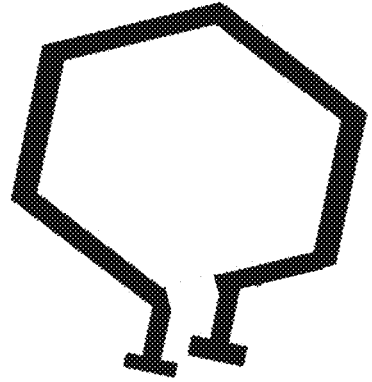
FIG. 12

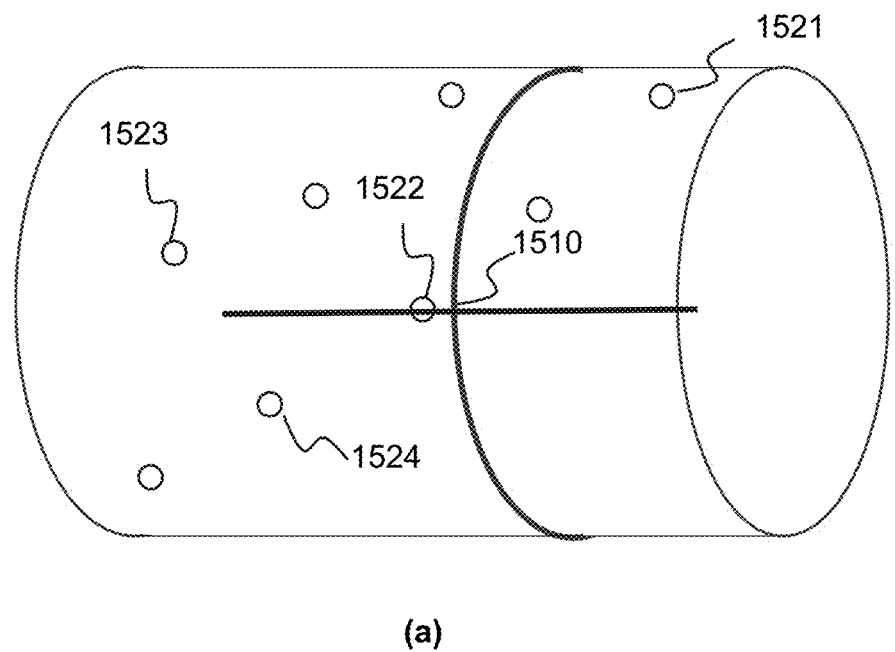
(a)
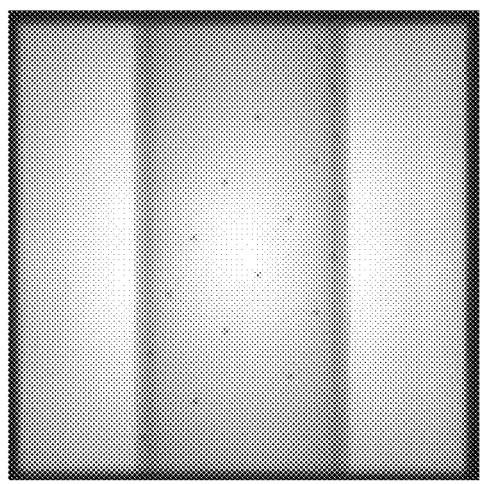
(b)
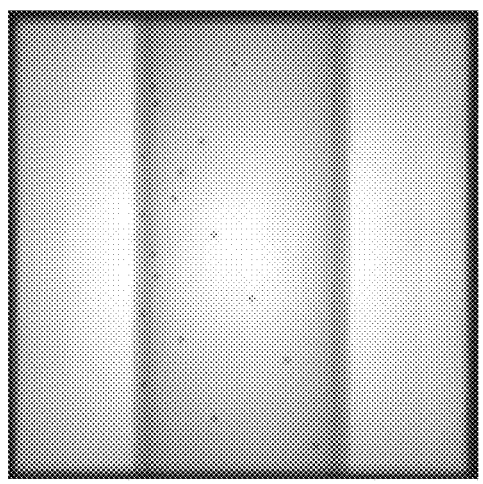
(c)
FIG. 15

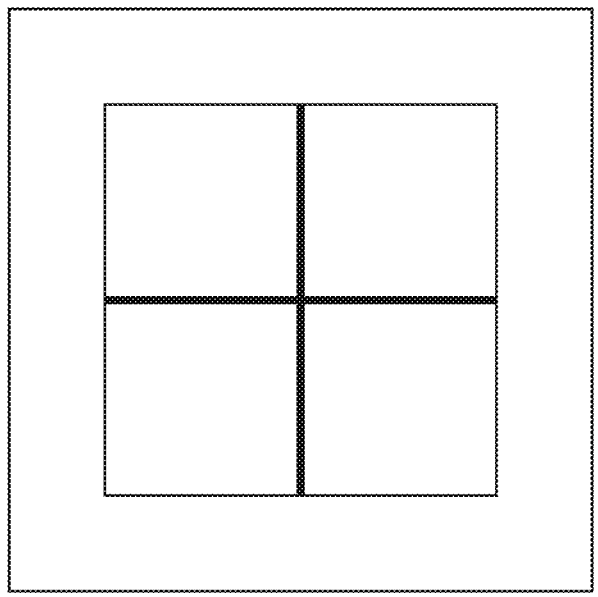
(a)
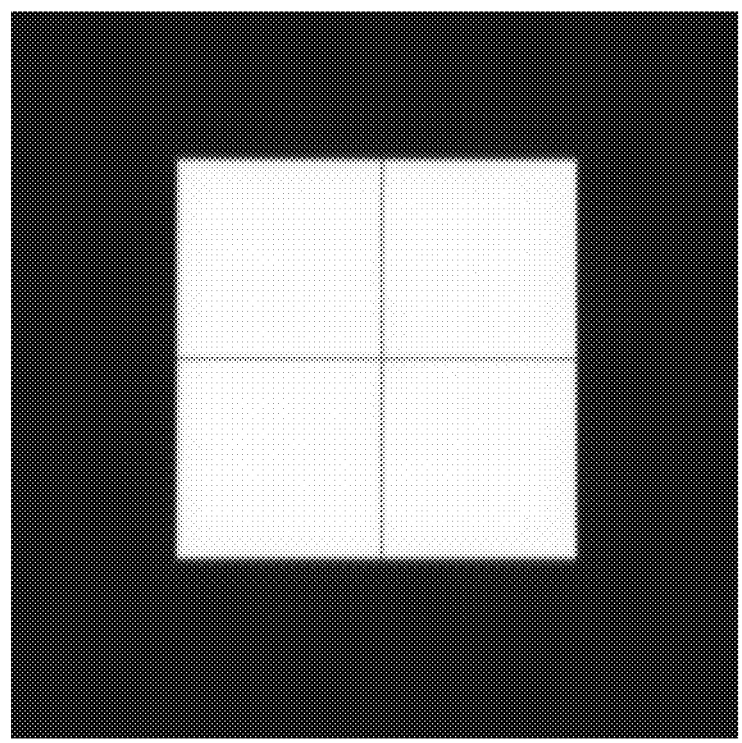
(b)
FIG. 16A

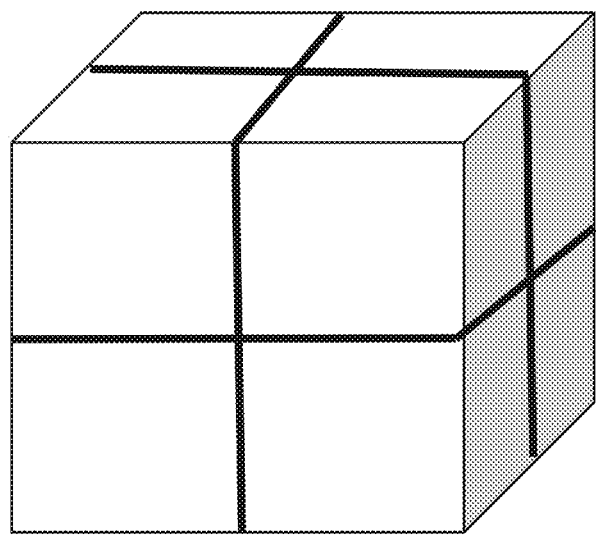
(a)
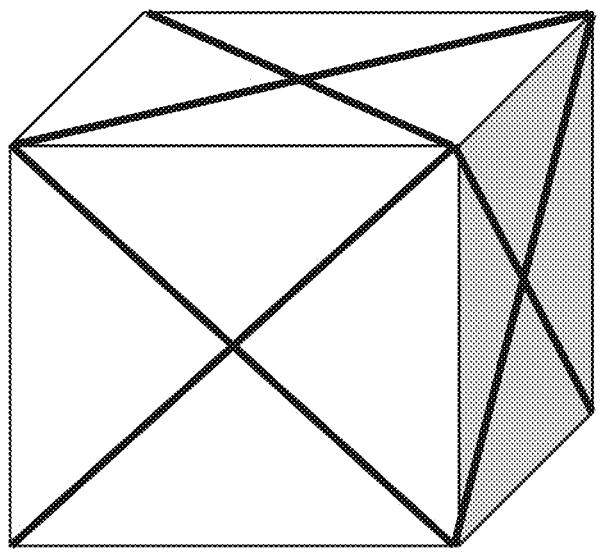
(b)
FIG. 16B

(a)            (b)

METHODS AND SYSTEMS FOR CALIBRATING MEDICAL DEVICES

CROSS-REFERENCE TO RELATED APPLICATIONS

This application claims the priorities of Chinese Patent Application No. 202310108901.1, filed on Feb. 11, 2023, and Chinese Patent Application No. 202320187874.7, filed on Feb. 11, 2023, the entire contents of each of which are hereby incorporated by reference.

TECHNICAL FIELD

The present disclosure relates to the field of medical devices, and in particular, to methods and systems for calibrating medical devices.

BACKGROUND

In the field of medical devices, an image of a target object obtained by a magnetic resonance (MR) device exhibits relatively high soft tissue resolution and may be applied in medical imaging, or may be used as a guidance image for a radiotherapy system, or the like. To position the target object (e.g., a patient) at a center of a gradient field domain of the MR device, the center of the gradient field domain of the MR device may be calibrated using a magnetic field measurement component. During actual gradient field testing, a relatively small current entering a gradient coil result in a relatively small gradient field and the result is significantly influenced by an absolute error of the magnetic field measurement component, necessitating multiple measurements of the distribution of a gradient field in the gradient field domain. However, due to limitations such as bandwidths of radiofrequency transmit/receive coils, multiple calibrations for the gradient field using the magnetic field measurement component require a field-raising/field-lowering operation on a main magnetic field. However, calibrating the center of the gradient field domain of the MR device by raising and lowering a superconducting magnet may pose risks of quenching the MR device with field movement, and lowering the field consumes a large amount of liquid nitrogen, increasing economic costs. In addition, in a radiotherapy device guided by nuclear magnetic resonance (NMR), the radiotherapy device uses a calibration phantom for field center calibration, while the MR device uses field-raising/field-lowering for calibration, resulting in inefficient calibration of the gradient field in the device.

Therefore, it is desirable to provide a method and a system for calibrating a medical device to avoid raising and lowering the superconducting magnet while enhancing the accuracy of MR image-guided radiotherapy.

SUMMARY

A first aspect of the present disclosure provides a method for calibrating a medical device implemented on a computing device having one or more processors and one or more storage devices. The medical device may include an MR device, and the method may include switching a gradient field in at least one gradient direction of the MR device; obtaining, by using a magnetic flux measurement component, a magnetic flux variation in the at least one gradient direction in at least one portion of a spatial region within a gradient field domain of the MR device; and determining, based on the magnetic flux variation, a center of the gradient field domain of the MR device. The method may further include performing, based on the center of the gradient field domain, a mechanical adjustment on the MR device to locate the center of the gradient field domain at a target position, or adjusting, based on the center of the gradient field domain, an image reconstruction process performed on data generated by the MR device to correct or eliminate an impact of inaccuracy of the center of the gradient field domain on an image reconstructed based on the data.

In some embodiments, the target position may be a center of a radiation field of a RT device in an MR-RT device that comprises the MR device.

In some embodiments, the adjusting, based on the center of the gradient field domain, an image reconstruction process performed on data generated by the MR device may include: calibrating, based on a position deviation between the center of the gradient field domain and the target position, an image coordinate system used in the image reconstruction process.

In some embodiments, the method may further include placing the magnetic flux measurement component in a mechanical center of the MR device.

In some embodiments, the magnetic flux measurement component may include a three-dimensional (3D) magnetic induction coil array.

In some embodiments, the switching a gradient field in at least one gradient direction of the MR device may include switching an electric current of a gradient coil of the MR device corresponding to the at least one gradient direction, wherein the at least one gradient direction includes at least one of an X direction, a Y direction, or a Z direction.

In some embodiments, the switching an electric current of a gradient coil of the MR device corresponding to the at least one gradient direction may include switching the gradient field in any one of the at least one gradient direction, and reversing the gradient field in another one of the at least one gradient direction after restoring the gradient field.

In some embodiments, the switching an electric current of a gradient coil of the MR device corresponding to the at least one gradient direction may include switching gradient fields in any two or more of the at least one gradient direction simultaneously.

In some embodiments, the determining, based on the magnetic flux variation, a center of the gradient field domain of the MR device may include: obtaining, based on the magnetic flux variation, a distribution of the magnetic flux variation in the at least one portion of the spatial region within the gradient field domain; determining, based on the distribution of the magnetic flux variation, a position with a minimal magnetic flux change in the at least one portion of the spatial region within the gradient field domain; and designating the position with the minimal magnetic flux change as the center of the gradient field domain of the MR device.

In some embodiments, the method may further include: determining, based on the distribution of the magnetic flux variation, an axial offset of the gradient field; and performing, based on the axial offset of the gradient field, the mechanical adjustment on the MR device.

A second aspect of the present disclosure provides a method for calibrating a medical device implemented on a computing device having one or more processors and one or more storage devices. The medical device may include a first device or a second device combined with the first device. The method may include calibrating a second center of the second device using a calibration phantom, including: obtaining, by using the calibration phantom, a magnetic flux variation in at least one gradient direction in at least one portion of a spatial region within a gradient field domain of the second device; determining, based on the magnetic flux variation, the second center of the second device; and performing, based on the second center of the second device, a calibration on the second device to cause the second center of the second device to coincide with the first center of the first device.

In some embodiments, the method may further include: obtaining a first image of the calibration phantom using the first device; performing a calibration on the first center of the first device based on the first image; and moving a reference center of the calibration phantom to the first center of the first device, before performing the calibration on the second center of the second device using the calibration phantom.

In some embodiments, the performing, based on the second center of the second device, a calibration on the second device may include: obtaining a first offset between the second center and the first center; and performing a mechanical adjustment on the second device based on the first offset to cause the second center to coincide with the first center.

In some embodiments, the performing, based on the second center of the second device, a calibration on the second device may include: obtaining a second offset between the second center and the reference center of the calibration phantom; and performing a mechanical adjustment on the second device based on the second offset to cause the second center to coincide with the first center.

In some embodiments, the calibration phantom may include one or more layers of coil arrays. The one or more layers of coil arrays may be configured to obtain the magnetic flux variation of the second device in at least two gradient directions of the at least one gradient direction to facilitate the calibration of the second center of the gradient field domain of the second device in the at least two gradient directions.

In some embodiments, at least one layer of coil array of the one or more layers of coil arrays may include a plurality of coils, and the plurality of coils may be arranged to form a flat combination.

In some embodiments, the plurality of coils may include at least a first coil and a second coil. A size of the first coil may be larger than a size of the second coil. The first coil may be distributed in an edge region of the at least one layer of coil array for calibrating a symmetry of a gradient field in the gradient field domain, and the second coil may be distributed in a central region of the at least one layer of coil array.

In some embodiments, the calibration phantom may include a multi-layer of coil arrays arranged spaced apart from each other, and two adjacent layers of coil arrays of the multi-layer of coil arrays may be arranged opposite to each other.

In some embodiments, at least one layer of coil array of the one or more layers of coil arrays may include a plurality of coils. The plurality of coils may be arranged along a first gradient direction or a second gradient direction of the at least two gradient directions to facilitate the calibration on the second center of the gradient field domain in the first gradient direction or the second gradient direction.

A third aspect of the present disclosure provides a system for calibrating a medical device. The medical device may include an MR device, and the system may include at least one storage medium storing a set of instructions and at least one processor in communication with the at least one storage medium. When executing the set of instructions, the at least one processor may be directed to cause the system to perform operations which may include: obtaining, by using a magnetic flux measurement component, a magnetic flux variation in at least one gradient direction in at least one portion of a spatial region within a gradient field domain of the MR device; determining, based on the magnetic flux variation, a center of the gradient field domain of the MR device; and performing, based on the center of the gradient field domain, a mechanical adjustment on the MR device to locate the center of the gradient field domain at a target position, or adjusting, based on the center of the gradient field domain, an image reconstruction process performed on data generated by the MR device to correct or eliminate an impact of inaccuracy of the center of the gradient field domain on an image reconstructed based on the data.

BRIEF DESCRIPTION OF THE DRAWINGS

The present disclosure is further illustrated by way of exemplary embodiments, which are described in detail through the accompanying drawings. These embodiments are not limiting, and in these embodiments, the same numbering indicates the same structure, wherein:

FIG. 3 is a flowchart illustrating an exemplary process for calibrating a center of a gradient field domain of an MR device according to some embodiments of the present disclosure;

FIG. 12 is a schematic diagram illustrating an exemplary coil structure according to some embodiments of the present disclosure;

FIG. 15 is a schematic diagram illustrating another exemplary calibration phantom for calibrating an integrated device according to some embodiments of the present disclosure;

FIGS. 16A-16B are schematic diagrams illustrating another exemplary calibration phantom for calibrating an integrated device according to some embodiments of the present disclosure.

DETAILED DESCRIPTION

Figure 1:
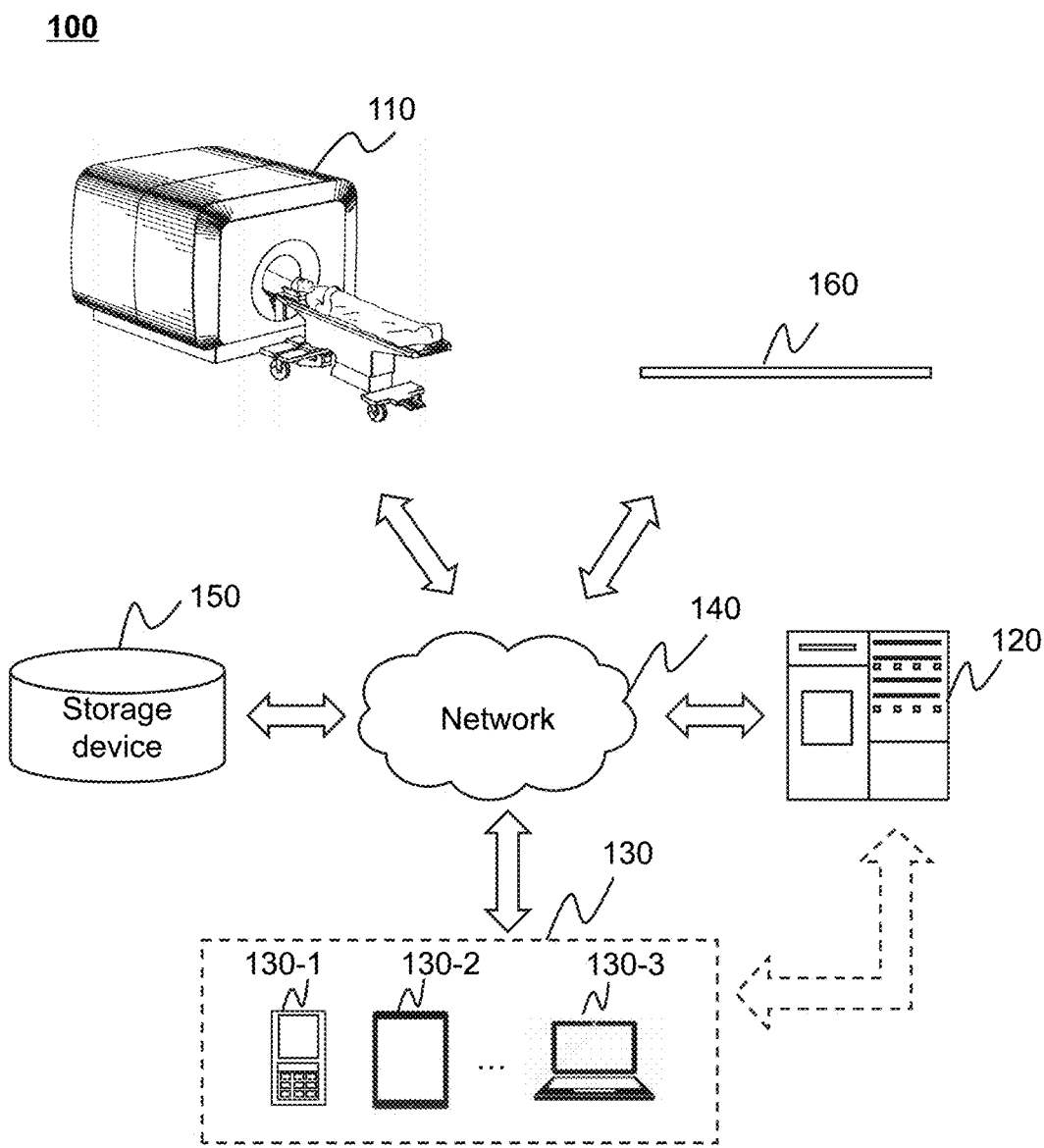
FIG. 1 is a schematic diagram illustrating an exemplary application scenario of a system for calibrating a medical device according to some embodiments of the present disclosure.

In order to more clearly illustrate the technical solutions of the embodiments of the present disclosure, the accompanying drawings for the description of the embodiments are described below. Obviously, the accompanying drawings in the following description are only some examples or embodiments of the present disclosure, and it is possible for a person of ordinary skill in the art to apply the present disclosure to other similar scenarios in accordance with these accompanying drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, if other words may achieve the same purpose, the terms may be replaced with alternative expressions.

As indicated in the present disclosure and in the claims, unless the context clearly suggests an exception, the words "one," "a," "a kind of," and/or "the" do not refer specifically to the singular but may also include the plural. In general, the terms "include" and "comprise" suggest only the inclusion of clearly identified steps and elements, which do not constitute an exclusive list, and the method or device may also include other steps or elements.

The present disclosure uses flowcharts to illustrate the operations performed by the system according to some embodiments of the present disclosure. It should be understood that the operations described herein are not necessarily executed in a specific order. Instead, they may be executed in reverse order or simultaneously. Additionally, other operations may be added to these processes or certain steps may be removed.

FIG. 1 is a schematic diagram illustrating an exemplary application scenario of a system for calibrating a medical device according to some embodiments of the present disclosure. The system 100 for calibrating a medical device may calibrate a center of a field of a device (e.g., an MR device or an integrated device) using a magnetic flux measurement component (e.g., a calibration phantom) by implementing the method(s) and/or process(es) disclosed in the present disclosure.

As shown in FIG. 1, the system 100 for calibrating the medical device may include a medical device 110, a processing device 120, at least one terminal device 130, a network 140, and/or a storage device 150, etc. Components of the system 100 for calibrating the medical device may be connected in one or more different ways. For example, as illustrated in FIG. 1, the medical device 110 may be connected to the processing device 120 via the network 140. As another example, the medical device 110 may be directly connected to the processing device 120 (as indicated by the dashed bi-directional arrow connecting the medical device 110 and the processing device 120). As yet another example, the storage device 150 may be directly or indirectly connected to the processing device 120 via the network 140. As still another example, the at least one terminal device 130 may be directly (as indicated by the dashed bi-directional arrow connecting the at least one terminal device 130 and the processing device 120) and/or indirectly connected to the processing device 120 via the network 140.

The medical device 110 may be a device capable of acquiring an MR image of a target object. In some embodiments, the target object may include a human body, an organ, an organism, a phantom, a region of interest thereof, a damaged site, a tumor, or the like. In some embodiments, the medical device 110 may be an MR device. The MR device may emit radiofrequency pulse(s) to the target object within a magnetic field. After absorbing energy, a hydrogen nuclei of the target object may release energy when the radiofrequency pulse(s) cease. An imaging device may convert the received energy into electrical signals and generate an MR image based on the electrical signals.

In some embodiments, the medical device 110 may be an integrated device including an MR device and a radiation therapy (RT) device. The RT device may use one or more radiation beams to treat the target object. In some embodiments, the RT device may use the magnetic resonance image generated by the MR device to guide positioning of the target object. In some embodiments, the integrated device may include an electronic portal imaging device (EPID) 160. The EPID 160 may be configured to acquire an image of the target object in a direction of radiation beam(s) emitted by the RT device. In some embodiments, the EPID 160 may receive energy attenuated by the target object during a radiation therapy process, convert the received energy into electrical signals, and generate an image based on the electrical signals. In some embodiments, the image generated by the EPID 160 may indicate a dose distribution received by the target object, such that a treatment plan for the target object may be verified.

The processing device 120 may process data and/or information obtained from the medical device 110, the at least one terminal device 130, and/or the storage device 150. For example, the processing device 120 may determine, based on a magnetic flux variation, a distribution of the magnetic flux variation in at least one gradient direction in at least one portion of a spatial region within a gradient field domain of the medical device 110. As another example, the processing device 120 may determine a position with a minimal magnetic flux change in at least one gradient direction in the at least one portion of the gradient field domain based on the distribution of the magnetic flux variation within the gradient field domain. In some embodiments, the processing device 120 may include at least one of a central processing unit (CPU), a digital signal processor (DSP), a system-on-chip (SoC), a microcontroller unit (MCU), or any combination thereof. In some embodiments, the processing device 120 may include a computer, a user console, a single server, or a server group, which may be centralized or distributed. In some embodiments, the processing device 120 may be local or remote. For example, the processing device 120 may access information and/or data stored in the medical device 110, the at least one terminal device 130, and/or the storage device 150 via the network 140. As another example, the processing device 120 may directly connect to the medical device 110, the at least one terminal device 130, and/or the storage device 150 to access stored information and/or data. In some embodiments, the processing device 120 or a part thereof may be integrated into the medical device 110.

The at least one terminal device 130 may display a captured image to a user. The at least one terminal device 130 may include a mobile device 130-1, a tablet computer 130-2, a laptop computer 130-3, or any combination thereof. In some embodiments, the at least one terminal device 130 may be a part of the processing device 120.

The network 140 may include any suitable network facilitating the exchange of information and/or data for the system 100 for calibrating the medical device. In some embodiments, one or more components (e.g., the medical device 110, the processing device 120, the storage device 150, the at least one terminal device 130) of the system 100 for calibrating the medical device may communicate information and/or data with one or more other components of the system 100 for calibrating a medical device via the network 140. In some embodiments, the network 140 may be or include at least one of a public network, a private network, a wired network, a wireless network, a cellular network, a frame relay network, a virtual private network, a satellite network, a telephone network, a router, a hub, a switch, a server computer, or any combination thereof. In some embodiments, the network 140 may include one or more network access points. For example, the network 140 may include at least one of a wired network access point or a wireless network access point such as a base station or an internet exchange point, allowing one or more components of the system 100 for calibrating the medical device to connect to the network 140 for data and/or information exchange.

The storage device 150 may store data, instruction(s), and/or any other information. In some embodiments, the storage device 150 may store data obtained from the medical device 110, the at least one terminal device 130, and/or the processing device 120. In some embodiments, the storage device 150 may store data and/or instruction(s), and the processing device 120 may execute or use such data and instruction to perform exemplary methods/systems described in the present disclosure. The storage device 150 may include a high-capacity storage, a removable storage, a volatile random-access memory (RAM), a read-only memory (ROM), or any combination thereof. In some embodiments, the storage device 150 may be implemented on a cloud platform, such as at least one of a private cloud, a public cloud, a hybrid cloud, a community cloud, a distributed cloud, or any combination thereof. In some embodiments, the storage device 150 may be a part of the processing device 120.

It should be noted that the above description is provided for illustrative purposes and is not intended to limit the scope of the present disclosure. Those skilled in the art may make various changes and modifications under the guidance of the content of the present disclosure. Features, structures, methods, and other characteristics of exemplary embodiments described in the present disclosure may be combined in various ways to obtain additional and/or alternative exemplary embodiments. However, such variations and modifications do not depart from the scope of the present disclosure. In some embodiments, the processing device 120 may be cloud-based, such as on a public cloud, a private cloud, a community cloud, or a hybrid cloud. Such variations are within the scope of the present disclosure.

Figure 2:
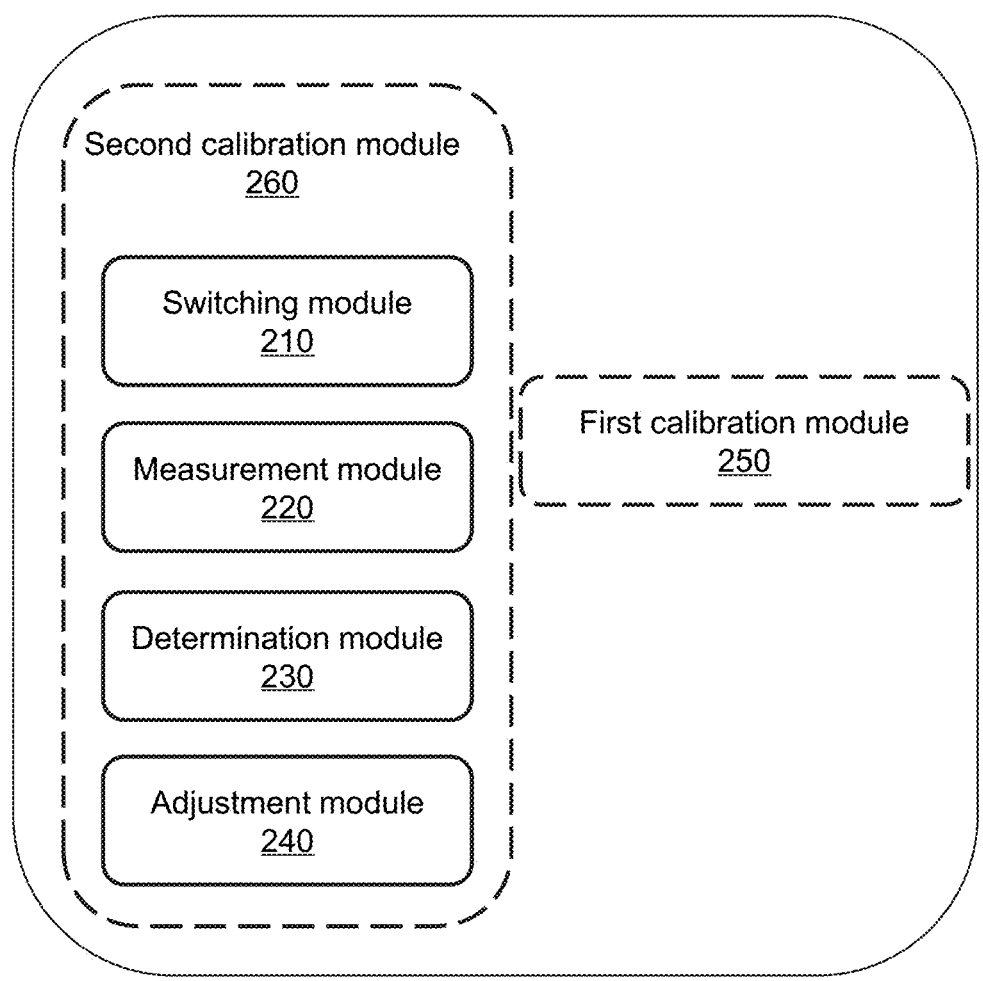
FIG. 2 is a schematic diagram illustrating an exemplary system for calibrating a medical device according to some embodiments of the present disclosure.

FIG. 2 is a schematic diagram illustrating an exemplary system for calibrating a medical device according to some embodiments of the present disclosure. As shown in FIG. 2, a system 200 for calibrating a medical device may include a switching module 210, a measurement module 220, a determination module 230, and an adjustment module 240. In some embodiments, various modules of the system 200 for calibrating the medical device may be implemented by the processing device 120.

In some embodiments, the system 200 for calibrating the medical device may include a medical device for calibration. The medical device may include a first device and a second device that is integrated with the first device. The first device may include an RT device or the like, and the second device may include an MR device or the like.

In some embodiments, the switching module 210 may be configured to switch a gradient field of the MR device in at least one gradient direction. In some embodiments, the switching module 210 may switch an electrical current of a gradient coil corresponding to at least one gradient direction. The at least one gradient direction may include an X direction, a Y direction, and/or a Z direction. In some embodiments, the switching module 210 may switch the gradient field in any one of the at least one gradient direction, and reverse the gradient field in another one of the at least one gradient direction after restoring the gradient field. In some embodiments, the switching module 210 may switch gradient fields in any two or more of the at least one gradient direction simultaneously.

In some embodiments, the measurement module 220 may be configured to measure a magnetic flux variation in at least one gradient direction in at least one portion of a spatial region within a gradient field domain of an MR device using a magnetic flux measurement component. The magnetic flux measurement component may include a three-dimensional (3D) magnetic induction coil array, or the like. In some embodiments, the measurement module 220 may be configured to place the magnetic flux measurement component in a mechanical center of the MR device.

In some embodiments, the determination module 230 may be configured to determine a center of the gradient field domain of the MR device based on the magnetic flux variation in at least one gradient direction in at least one portion of the spatial region within the gradient field domain of the MR device. In some embodiments, the determination module 230 may be configured to obtain a distribution of the magnetic flux variation in the at least one portion of the spatial region within the gradient field based on the magnetic flux variation. The determination module 230 may be further configured to determine a position with a minimal magnetic flux change in the at least one portion of the spatial region within the gradient field domain based on the distribution of the magnetic flux variation, and designate the position with the minimal magnetic flux change as the center of the gradient field domain of the MR device. In some embodiments, the determination module 230 may be configured to determine an axial offset of the gradient field based on the distribution of the magnetic flux variation.

In some embodiments, the adjustment module 240 may be configured to perform a mechanical adjustment on the MR device based on the center of the gradient field domain of the MR device, such that the center of the gradient field domain of the MR device is placed at a target position. The target position may include a center of a radiation field of an RT device in an MR-RT integrated device that includes the MR device. In some embodiments, the adjustment module 240 may be configured to adjust an image reconstruction process performed on data generated by the MR device to correct or eliminate an impact of inaccuracy of the center of the gradient field domain on an image reconstructed based on the data. In some embodiments, the adjustment module 240 may be configured to calibrate an image coordinate system used in the image reconstruction process based on a position deviation between the center of the gradient field domain and the target position. In some embodiments, the adjustment module 240 may be configured to perform a mechanical adjustment on the MR device based on the axial offset of the gradient field.

In some embodiments, the system 200 for calibrating the medical device may further include a first calibration module 250. The first calibration module 250 may be configured to acquire a first image of a calibration phantom using a first device and calibrate a first center of the first device based on the first image. In some embodiments, the first calibration module 250 may be configured to move a reference center of the calibration phantom to the first center of the first device, before performing the calibration on the second center of the second device using the calibration phantom.

In some embodiments, the system 200 for calibrating the medical device may further include a second calibration module 260. The second calibration module 260 may be configured to calibrate a second center of a second device using a calibration phantom. In some embodiments, the second calibration module 260 may include the switching module 210, the measurement module 220, the determination module 230, and the adjustment module 240. In some embodiments, the second calibration module 260 may be configured to measure a magnetic flux variation in at least one gradient direction in at least one portion of a spatial region within a gradient field domain of the second device using the calibration phantom, and determine, based on the magnetic flux variation, a second center of the second device. The second calibration module 260 may be further configured to calibrate the second device to cause the second center of the second device to coincide with the first center of the first device. In some embodiments, the second calibration module 260 may be configured to obtain a first offset between the second center and the first center and perform, based on the first offset, a mechanical adjustment on the second device based on the first offset to cause the second center to coincide with the first center. In some embodiments, the second calibration module 260 may be configured to obtain a second offset between the second center and the reference center of the calibration phantom and perform, based on the second offset, a mechanical adjustment on the second device to cause the second center to coincide with the first center.

FIG. 3 is a flowchart illustrating an exemplary process for calibrating a center of a gradient field domain of an MR device according to some embodiments of the present disclosure. As shown in FIG. 3, the process 300 may include one or more of the following operations 310-350. In some embodiments, the processing device 120 may calibrate a medical device (e.g., the medical device 110) by executing the operations in process 300. In some embodiments, the medical device in process 300 may be an MR device.

In 310, a gradient field in at least one gradient direction of the MR device may be switched. In some embodiments, operation 310 may be executed by the switching module 210.

The gradient field to be switched may be a linear magnetic field. In some embodiments, the gradient field may include a frequency encoding gradient field (i.e., a readout gradient field), a phase encoding gradient field, a layer selection gradient field, or the like. The frequency encoding gradient field and the phase encoding gradient field may be used to frequency-encode and phase-encode collected signals filled into a k-space, respectively, allowing a position of the collected signals in a two-dimensional (2D) layer corresponding to the scanned object to be located. The layer selection gradient field may be used to locate the layer of the scanned object corresponding to the collected signals. In some embodiments, the gradient field may be a superposition of at least two of the frequency encoding gradient field (i.e., the readout gradient field), the phase encoding gradient field, and the layer selection gradient field.

In some embodiments, the at least one gradient direction may include an X direction, a Y direction, and/or a Z direction. The X, Y, and Z directions may correspond to the frequency encoding direction, the phase encoding direction, and the layer selection direction, respectively. Correspondingly, gradient fields along the X, Y, and Z directions may be the frequency encoding gradient field, the phase encoding gradient field, and the layer selection gradient field, respectively. Field strengths of the frequency encoding gradient field, the phase encoding gradient field, and the layer selection gradient field may linearly vary along the X, Y, and Z directions respectively, and a field strength direction of the field(s) may be the same as a main magnetic field direction (e.g., the Z direction).

In some embodiments, the processing device 120 may control the field strength and/or the gradient direction by applying currents with different sizes and/or polarities in gradient coil(s). In some embodiments, the MR device may include at least one pair of gradient coils. In some embodiments, the at least one pair of gradient coils may include at least two of a first gradient coil, a second gradient coil and a third gradient coil. The first gradient coil, the second gradient coil and/or the third gradient coil may generate the frequency encoding gradient field, the phase encoding gradient field and/or the layer selection gradient field, respectively.

Figure 5:
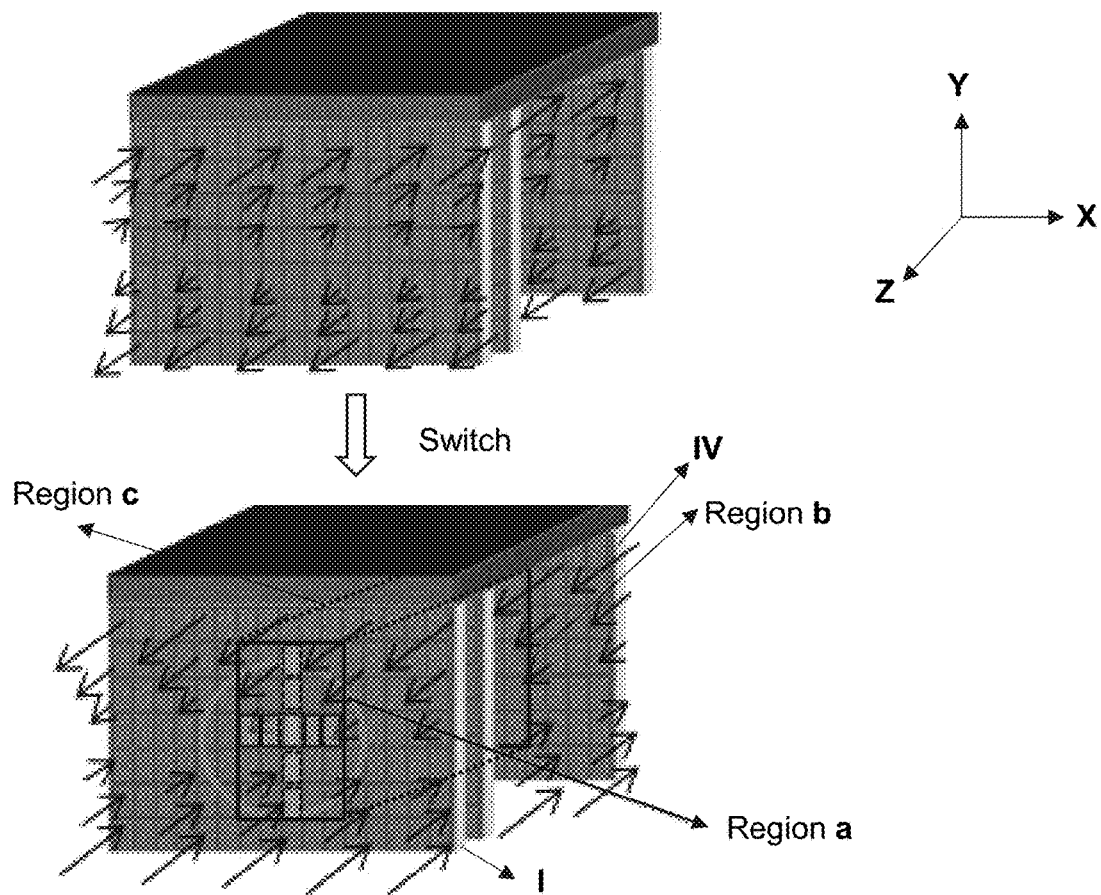
FIG. 5 is a schematic diagram illustrating switching a magnetic field according to some embodiments of the present disclosure.

In some embodiments, the processing device 120 may switch an electrical current of a gradient coil corresponding to the at least one gradient direction. For example, the processing device 120 may switch a polarity and/or an intensity of the electrical current(s). Merely by way of example, as shown in FIG. 5, before switching the magnetic field, the field strength of the phase encoding gradient field may linearly change from positive to negative along a positive Y direction. After switching the electrical current (i.e., reversing the polarity of the electrical current) of the gradient coil (i.e., the second gradient coil), the field strength of the phase encoding gradient field may linearly change from negative to positive along the positive Y direction. As another example, before switching the magnetic field, the field strength of the phase encoding gradient field may linearly change from +B to −B along the positive Y direction. After switching the current intensity of the second gradient coil, the field strength of the phase encoding gradient field may linearly change from +2B to −2B along the positive Y direction. In some embodiments of the present disclosure, by switching the electrical current of the gradient coil, the gradient field corresponding to the at least one gradient direction can be switched without a need for a field-raising/field-lowering operation on a main magnetic field.

In some embodiments, the processing device 120 may switch the gradient field in any one of the at least one gradient direction, and reverse the gradient field in another one of the at least one gradient direction after restoring the gradient field. For example, the processing device 120 may first switch the electrical current of the first gradient coil to switch the frequency encoding gradient field in the X direction. After the frequency encoding gradient field is restored, the processing device 120 may switch the electrical current of the second gradient coil to switch the phase encoding gradient field in the Y direction. After the phase encoding gradient field is restored, the processing device 120 may switch the electrical current of the third gradient coil to switch the layer selection gradient field in the Z direction. In some embodiments of the present disclosure, by sequentially switching the gradient field in any one of the at least one gradient direction, mutual interference between different gradient fields in different gradient directions can be reduced.

In some embodiments, the processing device 120 may switch gradient fields in any two or more of the at least one gradient direction simultaneously. For example, the processing device 120 may simultaneously switch the electrical currents of the first gradient coil and the second gradient coil, thereby simultaneously switching the frequency encoding gradient field and the phase encoding gradient field. In some embodiments of the present disclosure, by simultaneously switching the gradient field in any two of the at least one gradient direction, calibration efficiency can be improved.

In 320, a magnetic flux variation in at least one gradient direction in at least one portion of a spatial region within a gradient field domain of the MR device may be measured using a magnetic flux measurement component. In some embodiments, operation 320 may be executed by the measurement module 220.

A gradient field domain of the MR device is a region covered by a gradient field of the MR device. In some embodiments, the at least one portion of the spatial region within the gradient field domain may include at least one of a 2D plane or a 3D region. For example, as shown in FIG. 5, the at least one portion of the spatial region within the gradient field domain may include at least one of a region a in a first layer (layer I) of coil arrays, a region b in a fourth layer of coil arrays, or a 3D region c (indicated by the region formed by the dashed lines in FIG. 5) including the region a and the region b.

In some embodiments, the magnetic flux variation in at least one gradient direction may be a change in the magnetic flux before and after switching the at least one gradient field in the at least one direction. For example, the magnetic flux variation in the Y direction may be the change in magnetic flux of the phase encoding gradient field before and after switching the phase encoding gradient field.

As mentioned above, the field strength of the gradient field in any one of the at least one gradient direction changes linearly along the any one of the at least one gradient direction. Therefore, the magnetic flux along the any one of the at least one gradient direction also changes linearly accordingly. After switching the gradient field along the any one of the at least one gradient direction, the magnetic flux along the any one of the at least one gradient direction changes accordingly. For example, as shown in FIG. 5, the field strength of the phase encoding gradient field changes linearly from +B to −B along the Y direction, and the magnetic flux along the Y direction linearly changes from +BS to −BS (wherein S denotes an area of a region through which the magnetic flux passes). After reversing the phase encoding gradient field, the magnetic flux along the Y direction also changes linearly from −BS to +BS, and the magnetic flux variation along the Y direction changes linearly from −2BS to +2BS. As another example, when switching the phase encoding gradient field, the magnetic flux along the Y direction changes linearly from +2BS to −2BS, and the magnetic flux variation along the Y direction changes linearly from +BS to −BS.

A magnetic flux measurement component, such as a magnetic flux meter, a magnetic flux sensing unit, a magnetic induction coil array, etc., is a device used to measure the magnetic flux. In some embodiments, the magnetic flux measurement component may include a 3D magnetic induction coil array for measuring the magnetic flux in three gradient directions. In some embodiments, the magnetic flux measurement component may include a calibration phantom. The calibration phantom is a phantom used to calibrate a center of a gradient field domain of a medical device (e.g., the MR device). In some embodiments, the calibration phantom may include one or more layers of coil arrays. In some embodiments, the one or more layers of coil arrays may include at least one coil. In some embodiments, the at least one coil may form at least one array along at least one gradient direction. More descriptions regarding the calibration phantom may be found in FIGS. 9 to 13 and the related descriptions thereof.

Figure 4:
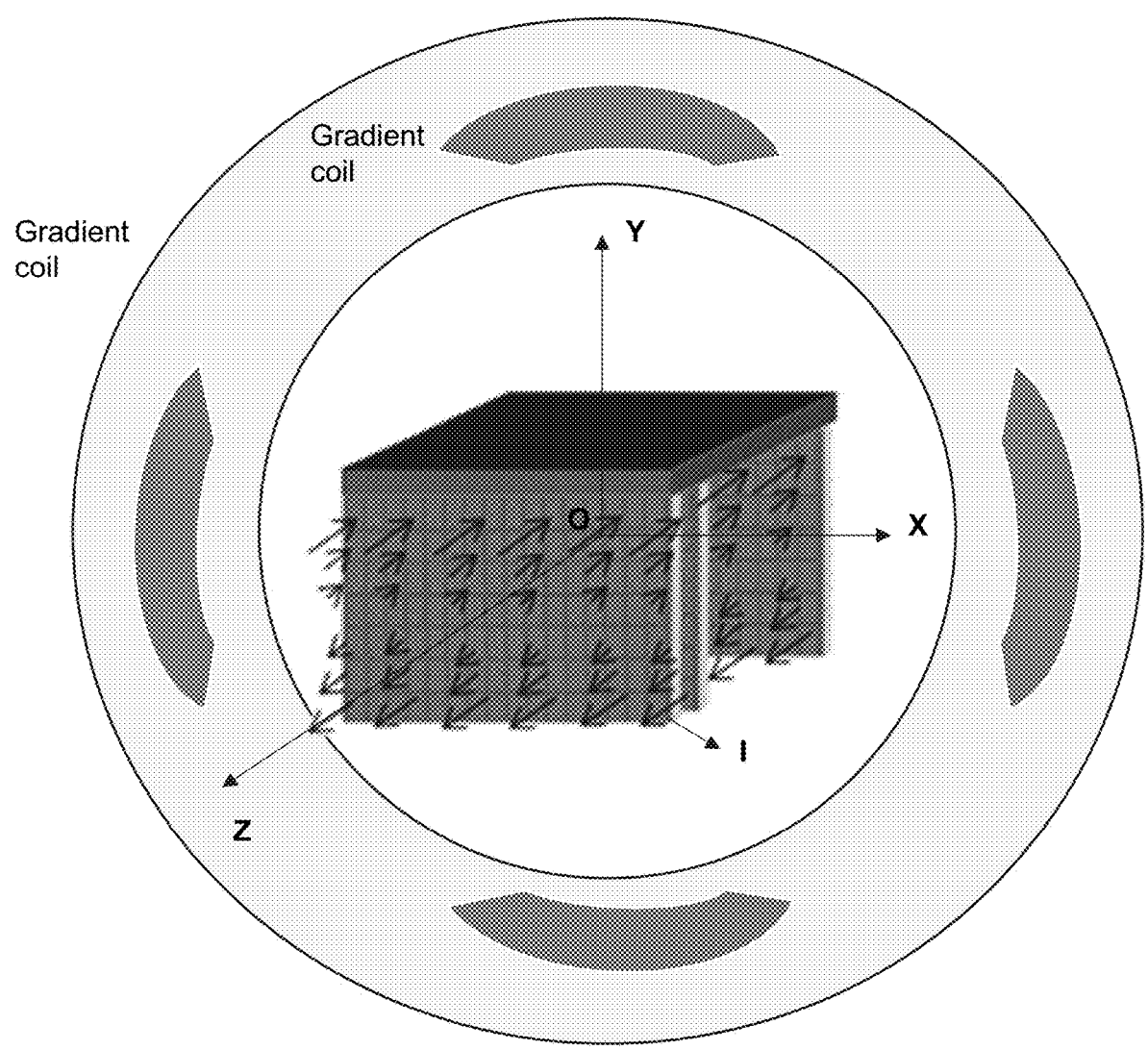
FIG. 4 is a schematic diagram illustrating an exemplary calibration of an MR device according to some embodiments of the present disclosure.

In some embodiments, the processing device 120 may place the magnetic flux measurement component at a mechanical center of the MR device. The mechanical center of the MR device may be a geometric center of a magnet of the MR device. In some embodiments, a main magnetic field coil and each pair of the at least one pair of gradient coils distributed on the magnet may be symmetric with respect to the mechanical center of the MR device. Therefore, ideally, the mechanical center of the MR device is also the center of the gradient field domain of the MR device. For example, as shown in FIG. 4, the mechanical center of the MR device is an axis center O of the magnet, and a geometric center O' (not shown) of the calibration phantom may be placed at the mechanical center O of the MR device. In some embodiments, the geometric center of the calibration phantom may be determined based on an isocenter marking located on an outer surface of a housing of the calibration phantom. More descriptions regarding the isocenter marking may be found in FIG. 13 and the related descriptions thereof.

In some embodiments, the processing device 120 may orient the one or more layers of coil arrays of the calibration phantom perpendicular to a main magnetic field direction. For example, as shown in FIG. 4, the layers of coil arrays of the calibration phantom are oriented perpendicular to the Z direction, parallel to an OXY plane, allowing magnetic lines pass vertically through a coil array layer plane of the calibration phantom.

Furthermore, in some embodiments, the processing device 120 may determine the magnetic flux variation in at least one gradient direction in the at least one portion of the spatial region based on an induced electrical current generated by at least one coil of the calibration phantom. For example, as shown in FIG. 5, the processing device 120 may determine the magnetic flux variation of the phase encoding gradient field in the Y direction in the region a based on an induced electrical current generated by 25 coils in the region a of the calibration phantom.

In some embodiments, calibration efficiency can be improved by locating the center of the gradient field domain of the MR device and the magnetic flux measurement component at the mechanical center of the MR device, such that the position of the magnetic flux measurement component coincides with the center of the gradient field domain of the MR device.

In some embodiments, when sequentially switching the gradient field in any one of the at least one gradient direction, the processing device 120 may measure the magnetic flux variation corresponding to the any one of the at least one gradient direction after each switch. For example, after switching the frequency encoding gradient field in the X direction, the processing device 120 may measure the magnetic flux variation in the at least one portion of the spatial region in the X direction (i.e., the magnetic flux variation of the frequency encoding gradient field); after switching the phase encoding gradient field in the Y direction, the processing device 120 may measure the magnetic flux variation in the at least one portion of the spatial region in the Y direction (i.e., the magnetic flux variation of the phase encoding gradient field); after switching the layer selection gradient field in the Z direction, the processing device 120 may measure the magnetic flux variation in the at least one portion of the spatial region in the Z direction (i.e., the magnetic flux variation of the layer selection gradient field).

In some embodiments, when simultaneously switching gradient fields in any two or more of the at least one gradient direction, the processing device 120 may measure magnetic flux variations in the at least one portion of the spatial region in the any two or more of the at least one gradient direction. For example, after simultaneously switching the frequency encoding gradient field and the phase encoding gradient field, the processing device 120 may simultaneously measure a magnetic flux variation in the at least a portion of the spatial region in the X direction and a magnetic flux variation in the at least a portion of the spatial region in the Y direction (i.e., a magnetic flux variation of a superimposed gradient field of the frequency encoding gradient field and the phase encoding gradient field).

It may be understood that when simultaneously switching gradient fields in any two or more of the at least one gradient direction, the magnetic flux variation of the superimposed gradient field measured by the processing device 120 may be considered as a superimposed magnetic flux variation of the gradient field in each of the at least one gradient direction.

In 330, the center of the gradient field domain of the MR device may be determined based on the magnetic flux variation in at least one gradient direction in the at least one portion of the spatial region within the gradient field. In some embodiments, operation 330 may be executed by the determination module 230.

The center of the gradient field domain may be the central position of the gradient field. The magnetic flux variation within the gradient field domain in each gradient direction changes linearly from negative to positive or from positive to negative. Therefore, theoretically, the magnetic flux variation at the center of the gradient field domain in each gradient direction is zero. In some embodiments, a position with a minimal magnetic flux change may be determined as the center of the gradient field domain of the MR device.

In some embodiments, the processing device 120 may obtain, based on the magnetic flux variation, a distribution of the magnetic flux variation in at least one gradient direction in at least one portion of the spatial region within the gradient field domain. The distribution of the magnetic flux variation may be represented by a magnetic flux matrix diagram or the like. Specifically, the processing device 120 may determine, based on a distribution of at least one coil in the at least one portion of the spatial region within the gradient field domain, the distribution of the magnetic flux variation in any one of the at least one gradient direction obtained by the at least one coil. For example, in the magnetic flux matrix diagram shown in FIG. 5, based on a distribution of 25 coils arranged in a pattern of 5×5 in the region a, the processing device 120 may acquire a distribution of 25 magnetic flux variations in the Y direction obtained by the 25 coils. Similarly, based on a distribution of 125 coils arranged in a pattern of 5×5×5 in the region c, the processing device 120 may simultaneously acquire a distribution of 125 magnetic flux variations in the X, Y, and Z directions respectively obtained by the 125 coils.

In some embodiments, the processing device 120 may determine, based on the distribution of the magnetic flux variation in at least one direction, a position with the minimal magnetic flux change in at least one portion of the spatial region within the gradient field domain, and designate the position with the minimal magnetic flux change as the center of the gradient field domain of the MR device.

Specifically, in some embodiments, the processing device 120 may determine, based on a distribution of magnetic flux variations in any of the at least one gradient direction in the at least one portion of the spatial region within the gradient field domain for each layer of the one or more layers of coil arrays, a minimal magnetic flux variation among the at least one magnetic flux variation corresponding to the at least one coil in any set of coil arrays of the one or more layers of coil arrays in the any one of the at least one gradient direction. Then the processing device may designate a position of the coil corresponding to the minimal magnetic flux variation as the position with the minimal magnetic flux change for the any set of coil arrays in the any one of the at least one gradient direction.

For example, as shown in FIG. 5, the 25 coils arranged in the pattern of 5×5 in the region a of the first layer (layer I) of coil arrays are arranged in 5 columns of coil arrays along the Y direction, and the table in FIG. 5 represents a distribution of magnetic flux variations in the Y direction in the region a. Based on the distribution of the magnetic flux variations in the Y direction in the region a, the processing device 120 may determine that the minimal magnetic flux variation in the Y direction for the 5 coils in a first column of coils is 0.25. Then the position of the third coil corresponding to 0.25 may be determined as the position with the minimal magnetic flux change corresponding to the first column of coils. Similarly, the processing device 120 may determine that minimal magnetic flux variations corresponding to a second, a third, a fourth, and a fifth columns of coils in the region a to be 0.5, −0.5, 0.25, and 0.3 respectively. Positions of the five coils (indicated by the five shaded boxes outlined with solid lines in FIG. 5) corresponding to the minimal magnetic flux variations may then be determined as the positions with the minimal magnetic flux change in the Y direction in the region a for the five sets of coil arrays of the first layer (layer I) of coil arrays. Similarly, the 25 coils arranged in the pattern of 5×5 in the region a of the first layer (layer I) of coil arrays are arranged in 5 rows along the X direction, and the processing device 120 may determine positions (indicated by the shaded boxes outlined with dashed lines in FIG. 5) with minimal magnetic flux variations in the X direction in the region a corresponding to the five sets of coil arrays based on a distribution (not shown in FIG. 5) of magnetic flux variations in the X direction in the region a.

In some embodiments, after determining the positions with the minimal magnetic flux variations in the X and Y directions in at least one portion of a spatial region (e.g., the region a) within the gradient field for the sets of coils, the processing device 120 may further determine, based on a distribution of magnetic flux variations in the Z direction in at least one portion of the spatial region (e.g., the region c) within the gradient field corresponding to a multi-layer of coil arrays, a minimal magnetic flux variation among at least one magnetic flux variation corresponding to at least one coil in any set of coil array of the multi-layer of coil arrays in the Z direction. A position of the coil corresponding to the minimal magnetic flux variation may be determined as the position with the minimal magnetic flux change in the Z direction in the at least one portion of the spatial region in the gradient field corresponding to the any set of coil arrays.

Merely by way of example, as shown in FIG. 5, the region c may include four layers of coil arrays (i.e., the first layer (layer I) of coil arrays, a second layer (layer II) of coil arrays, a third layer (layer III) of coil arrays, and a fourth layer (layer IV) of coil arrays, where the second and the third layers (layers II and III) of coil arrays are not shown in FIG. 5). Coils located at a same corresponding position on each layer of the four layers of coil arrays may form a set of coil arrays in the Z direction. For example, the coil in the first row and the first column of the region a in the first layer (layer I) of coil arrays and three coils locate at the same corresponding position on the other three layers of coil arrays (i.e., the coil in the first row and the first column of the region a in the second layer (layer II) of coil arrays, the coil in the first row and the first column of the region a in the third layer (layer III) of coil arrays, and the coil in the first row and the first column of the region a in the fourth layer (layer IV) of coil arrays) may form a set of coil arrays in the Z direction. Similarly, each of the 25 coils in the region a may respectively form a set of coil arrays in the Z direction with coils located at the same corresponding position in the other three layers of coil arrays, resulting a total of 25 sets of coil arrays in the Z direction, each set including four coils. Based on a distribution of magnetic flux variations in the Z direction in the region c, the processing device 120 may determine that positions of the 25 coils on the third layer (layer III) of coil arrays are the positions with the minimal magnetic flux change in the Z direction in the region c corresponding to the 25 sets of coil arrays respectively.

In some embodiments, if at least one portion of a spatial region within the gradient field has a distribution of magnetic flux variations on two sides of 0 in any one gradient direction (e.g., "from negative to positive" or "from positive to negative"), a position with the minimal magnetic flux variation in the any one gradient direction in the spatial region may be determined as the position with the minimal magnetic flux variation in the any one gradient direction. For example, as shown in FIG. 5, the magnetic flux variation in the Y direction in the region a goes from negative to positive. The processing device 120 may determine the position (represented by the shaded boxes outlined with solid lines in FIG. 5) with the minimal magnetic flux variation in the Y direction within the region a as the position with the minimal magnetic flux variation in the Y direction within the gradient field domain.

In some embodiments, if at least one portion of a spatial region in the gradient field has a distribution of magnetic flux variations on one side of 0 in any one gradient direction (e.g., "all negative values" or "all positive values"), the processing device 120 may determine the position with the minimal magnetic flux variation in the gradient field domain in the any one gradient direction based on the distribution of the magnetic flux variations in the at least one portion of the spatial region. For example, in FIG. 5, if the magnetic flux variations in the X direction in the region a have positive values, the processing device 120 may fit a linear relationship between positions and the magnetic flux variations in the X direction in the region a, and determine, based on the linear relationship, the position where the magnetic flux variation is 0 as the position with the minimal magnetic flux variation in the gradient field domain in the X direction.

In some embodiments, when a coil size precision does not meet a position precision of the center of the gradient field domain, the processing device 120 may determine, based on a distribution of magnetic flux variations in any one gradient direction in at least one portion of a spatial region within each layer of coil arrays, a position with a minimal magnetic flux variation in the any one gradient direction for the each layer of coil arrays. For example, in FIG. 5, assuming the coil size of each coil is 0.5 mm×0.5 mm, and the position precision for the center of the gradient field domain is 0.1 mm, there may be an error (e.g., 0.4 mm) in the position of the center of the gradient field domain. Therefore, the processing device 120 may determine, based on the linear relationship obtained from the fitting process, the position where the magnetic flux variation is 0 in any one gradient direction (any one of the X, Y, or Z directions) as the position with the minimal magnetic flux variation in the any one gradient direction within the gradient field domain.

Figure 6:
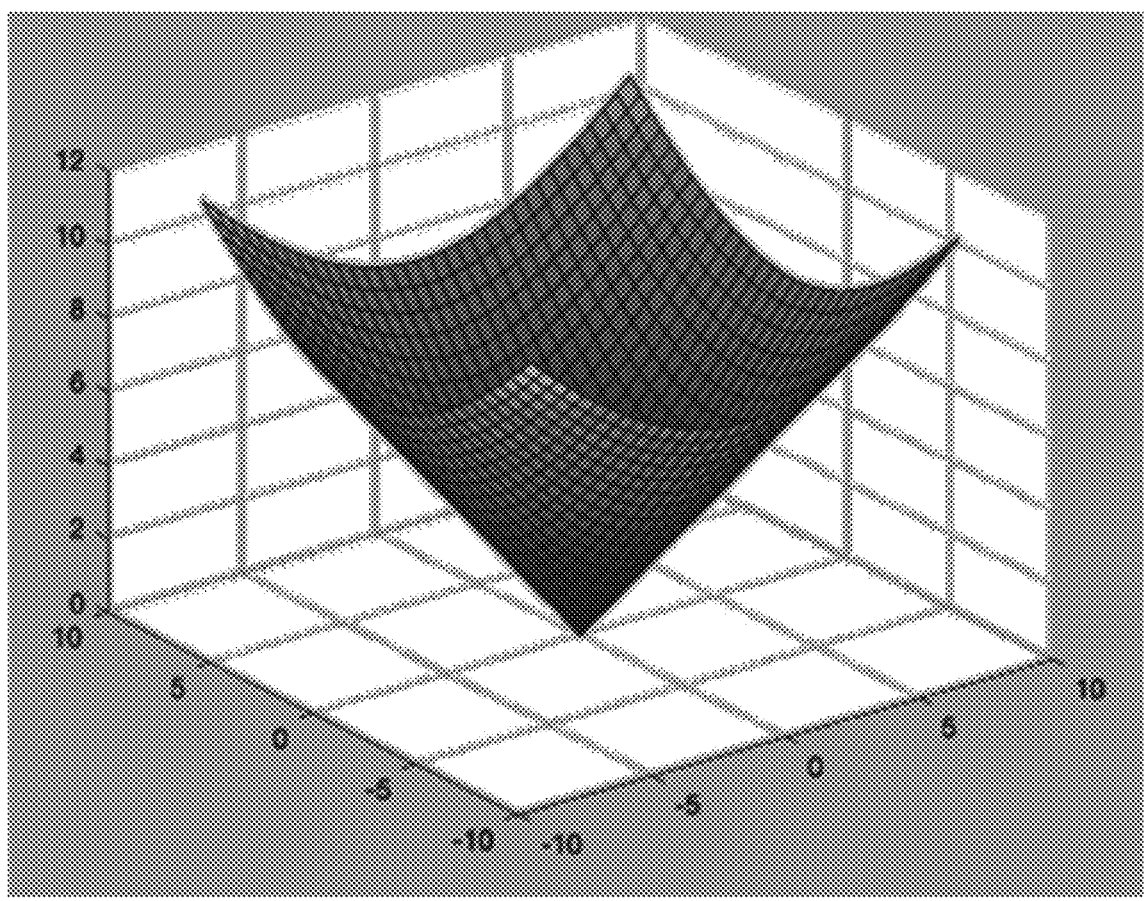
FIG. 6 is a schematic diagram illustrating a distribution of magnetic flux variations according to some embodiments of the present disclosure.

In some embodiments, the processing device 120 may determine an intersection of positions where the magnetic flux variation is minimal in at least two gradient directions within the gradient field domain as the position with the minimal magnetic flux variation within the gradient field domain. For example, the processing device 120 may take an intersection of any two or all three positions with minimal magnetic flux variations in the Y direction, the X direction, and the Z direction within the gradient field domain as the position with the minimal magnetic flux variation within the gradient field domain. FIG. 6 is a schematic diagram illustrating a distribution of magnetic flux variations according to some embodiments of the present disclosure. As shown FIG. 6, the processing device 120 may determine an intersection of positions where the magnetic flux variation is 0 in the Y direction, 0 in the X direction, and 0 in the Z direction within the gradient field as the position O" (i.e., the center of the gradient field domain) with the minimal magnetic flux variation in the gradient field.

In some embodiments, the processing device 120 may determine an axial offset of the gradient field domain based on the distribution of the magnetic flux variation in the at least one portion of the spatial region in at least one gradient direction within the gradient field domain.

In some embodiments, the processing device 120 may determine the position with the minimal magnetic flux variation for each layer of coil arrays within the gradient field domain based on the distribution of the magnetic flux variation in the at least one portion of the spatial region in the X and Y directions. For example, in FIG. 5, assuming O (not shown in FIG. 5) is the mechanical center of the MR device, and layers I, II, III, and IV are four layers of coil arrays in the region c. The processing device 120 may determine the intersection between the position (represented by the shaded boxes outlined with solid lines in FIG. 5) with the minimal magnetic flux variation in the Y direction and the position (represented by the shaded boxes outlined with dashed lines in FIG. 5) with the minimal magnetic flux variation in the X direction within region a as the position O-I with the minimal magnetic flux variation for the first layer (layer I) of coil arrays. Similarly, the processing device 120 may determine positions with the minimal magnetic flux variation for the second, third, and fourth layers of coil arrays as O-II, O-III, and O-IV, respectively.

In some embodiments, the processing device 120 may fit an axis of the gradient field domain based on the positions with the minimal magnetic flux variation on the multi-layers of coil arrays within the gradient field, and determine the axial offset of the gradient field domain based on a slope of a fitted axis. Using the example of FIG. 5, the processing device 120 may fit the axis of the gradient field domain based on at least two of the positions O-I, O-II, O-III, and O-IV, and represent the axis as z=k1*x+k2*y. The processing device 120 may then determine the axial offset of the gradient field domain based on the slope values k1 and k2.

In some embodiments of the present disclosure, by switching the gradient field and using the magnetic flux measurement component to obtain the magnetic flux variation in at least one gradient direction within the gradient field domain, the position with the minimal magnetic flux variation may be determined as the center of the gradient field domain based on the linear symmetry of the gradient field, thereby eliminating the need of the field-raising/field-lowering operation for the calibration of the center of the gradient field domain. In addition, by fitting the magnetic flux variation within the gradient field based on the magnetic flux variation in the at least one of the spatial region, a range and a frequency for the measurement of the gradient field can be reduced.

In some embodiments, after determining the center of the gradient field domain of the MR device, the processing device 120 may calibrate the MR device by executing operations 340 or 350 to correct or eliminate an impact of inaccuracy of the center of the gradient field domain on the imaging of the MR device. For example, operation 340 may be performed during routine maintenance calibration of the MR device. As another example, operation 350 may be executed during an actual operation of the MR device.

In 340, a mechanical adjustment may be performed on the MR device based on the center of the gradient field domain to locate the center of the gradient field domain at a target position. In some embodiments, operation 340 may be performed by the adjustment module 240.

A target position refers to a position of the mechanical center of the MR device or a position of a center of a radiation field of an RT device. Ideally, if the center of the gradient field domain of the MR device coincides with the mechanical center of the MR device or the center of the radiation field of the RT device, a measurement error caused by center deviation may be eliminated. In some embodiments, the target position may be the center of the radiation field of the RT device in an MR-RT integrated device, in which the mechanical center of the MR device coincides with the center of the radiation field of the RT device. Due to reasons such as production processes, typically, the center of the gradient field domain of the MR device does not coincide with the mechanical center of the MR device or the center of the radiation field of the RT device, resulting in a position deviation that requires calibration, even if the center of the gradient field domain of the MR device coincides with its mechanical center or the center of the radiation field of the RT device.

In some embodiments, the processing device 120 may move the MR/RT device by performing a mechanical adjustment on the MR/RT device based on the position deviation between the target position and the center of the gradient field domain of the MR device, such that the mechanical center of the MR device (or the center of the radiation field of the RT device) coincides with the center of the gradient field domain, thereby achieving calibration of the MR device, i.e., the calibration of the center of the gradient field domain of the MR device. In some embodiments, the processing device 120 may use a calibration phantom to calibrate the center of the gradient field domain of the MR device, in which a geometric center of the calibration phantom coincides with the mechanical center of the MR device. During the mechanical adjustment of the MR device, the processing device 120 may move the geometric center of the calibration phantom to the center of the gradient field domain of the MR device, thus placing the center of the gradient field domain of the MR device at the target position (i.e., the position of the mechanical center of the MR device or the position of the center of the radiation field of the RT device).

In some embodiments, if the center of the radiation field of the RT device coincides with the mechanical center of the MR device, the processing device 120 may calibrate the center of the gradient field domain of the MR device by performing the following operations: the processing device 120 may first obtain offset data (i.e., a coordinate difference between the coordinate of the center of the radiation field of the RT device and the coordinate of the center of the gradient field domain of the MR device) in the X, Y, and Z directions between the center of the radiation field of the RT device (or the mechanical center of the MR device) and the center of the gradient field domain. Then the processing device 120 may adjust a relative position between the center of the radiation field of the RT device and the center of the gradient field domain by mechanically adjusting the MR/RT device based on the offset data, and verify whether the center of the radiation field of the RT device coincides with the center of the gradient field domain. Specifically, the processing device 120 may acquire the position deviation between the center of the radiation field of the RT device and the center of the gradient field domain of the MR device. If the position deviation is less than or equal to a preset threshold (e.g., any value between 0.5 mm and 0.8 mm), it may be determined that the center of the radiation field of the RT device coincides with the center of the gradient field domain of the MR device, and the calibration may be determined to be completed. If the position deviation exceeds the preset threshold, it may be determined that the center of the radiation field of the RT device does not coincide with the center of the gradient field domain of the MR device. The above calibration process may be repeated until the center of the radiation field of the RT device coincides with the center of the gradient field domain of the MR device. In some embodiments, the coordinate of the center of the gradient field domain of the MR device may be obtained based on a magnetic flux matrix diagram measured using the MR device, and the coordinate of the center of the radiation field of the RT device may be obtained based on a flat-panel measurement graph obtained by the RT device. In some embodiments, the position deviation may be a distance between the coordinate of the center of the gradient field domain of the MR device and the coordinate of the center of the radiation field of the RT device. For example, if the coordinate of the center of the radiation field of the RT device is (x1, y1, z1), and the coordinate of the center of the gradient field domain of the MR device is (x1', y1', z1'), then the position deviation between the center of the radiation field of the RT device and the center of the gradient field domain of the MR device may be represented as $\Delta d=(x1-x1')^2+(y1-y1')^2+(z1-z1')^2$.

In some embodiments, the processing device 120 may perform a mechanical adjustment on the MR device based on the axial offset of the gradient field domain to eliminate the axial offset. Specifically, the processing device 120 may move the MR device by mechanically adjusting the MR device, such that the fitted axis of the gradient field domain is parallel to a Z-axis (if the axis is represented by $z=k1*x+k2*y$, wherein the slope k1 equals the slope k2), thereby eliminating the axial offset of the gradient field domain.

In some embodiments of the present disclosure, by determining the axial offset of the gradient field domain based on the distribution of the magnetic flux variation in at least one gradient direction in at least one portion of a spatial region within the gradient field domain, the axial offset of the gradient field domain can be eliminated while calibrating the center of the gradient field domain.

In 350, an image reconstruction process performed on data generated by the MR device may be adjusted based on the center of the gradient field domain to correct or eliminate an impact of inaccuracy of the center of the gradient field domain on an image reconstructed based on the data. In some embodiments, operation 350 may be executed by the adjustment module 240.

In some embodiments, the processing device 120 may calibrate, based on a position deviation between the center of the gradient field domain of the MR device and the target position, an image coordinate system used in the image reconstruction process. Specifically, if the center of the radiation field of the RT device coincides with the mechanical center of the MR device, the processing device 120 may obtain offset data in the X, Y, and Z directions between the center of the radiation field of the RT device and the center of the gradient field domain. The processing device 120 may determine whether the position deviation between the center of the radiation field of the RT device and the center of the gradient field domain of the MR device is less than or equal to a preset threshold (e.g., any value between 0.5 mm and 0.8 mm). If the position deviation is determined to be less than or equal to the preset threshold, the position deviation may be incorporated into the image coordinate system used in the image reconstruction process to automatically eliminate an error caused by position deviation in a reconstructed image, and the calibration may be completed. If the position deviation is determined to be greater than the preset threshold, the relative position between the center of the radiation field of the RT device and the center of the gradient field domain may be adjusted by performing a mechanical adjustment on the MR-RT device based on the offset data and the calibration process may be repeated until the calibration is completed.

In some embodiments of the present disclosure, by performing the mechanical adjustment on the MR/RT device based on the position deviation between the center of the radiation field of the RT device (or the mechanical center of the MR device) and the center of the gradient field domain of the MR device, the center of the radiation field of the RT device can coincide with the center of the gradient field domain of the MR device, such that the offset adjustment and the coincidence between the center of the radiation field of the RT device and an effective field center of the MR device (i.e., the center of the gradient field domain of the MR device) can be achieved efficiently.

Figure 7:
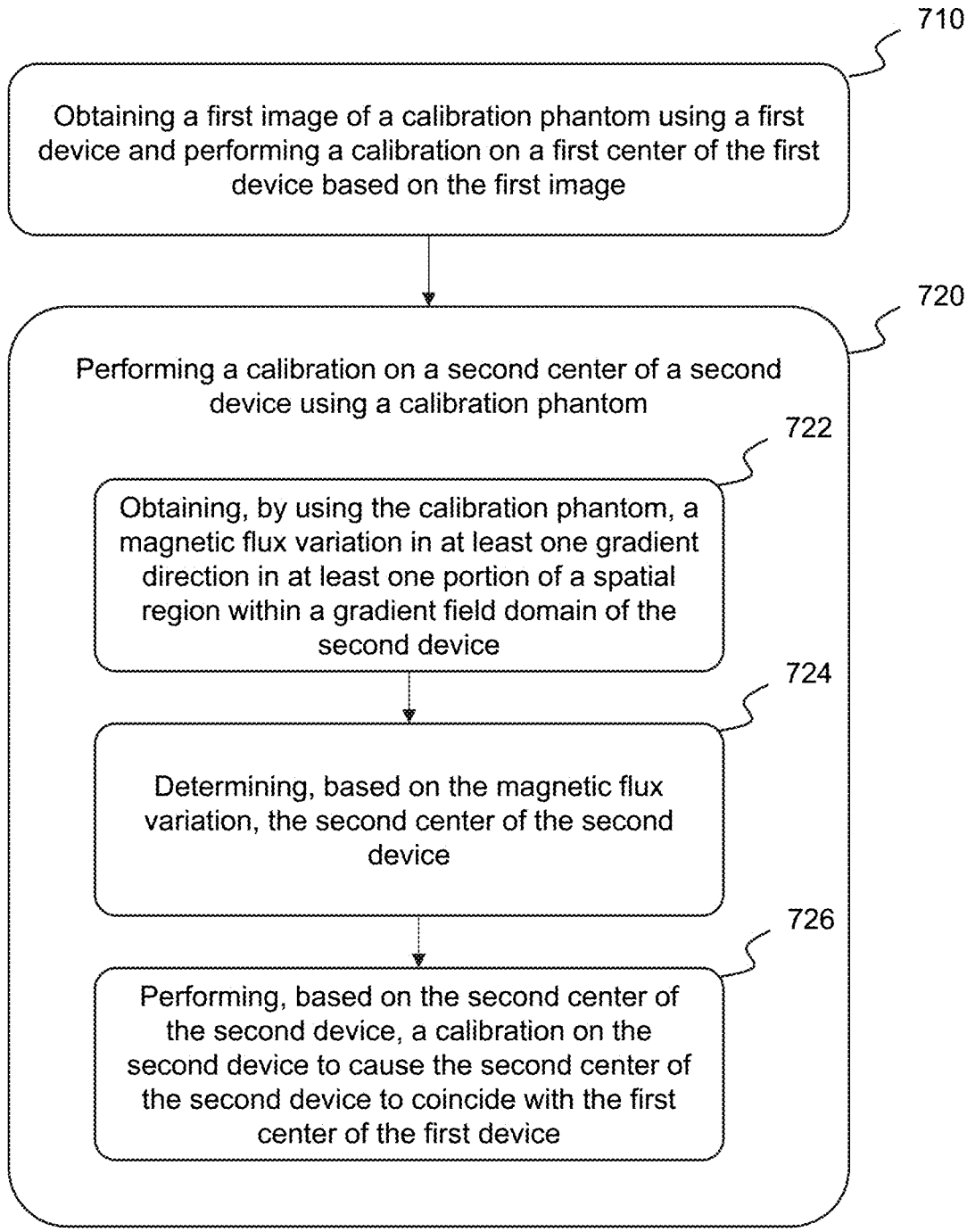
FIG. 7 is a flowchart illustrating an exemplary process for calibrating an integrated device according to some embodiments of the present disclosure.

FIG. 7 is a flowchart illustrating an exemplary process for calibrating an integrated device according to some embodiments of the present disclosure. As shown in FIG. 7, process 700 may include one or more of the following operations. In some embodiments, the processing device 120 may calibrate an integrated medical device (e.g., the medical device 110) by executing the method indicated in process 700. In some embodiments, the integrated medical device in process 700 may include a first device and a second device that is combined with the first device. The first device may include an RT device, and the second device may include an MR device. More descriptions regarding the RT device and the MR device may be found in FIG. 1 and the related descriptions thereof.

In 710, a first image of a calibration phantom may be obtained using the first device and a first center of the first device may be calibrated based on the first image. In some embodiments, operation 710 may be performed by the first calibration module 250.

Figure 8:
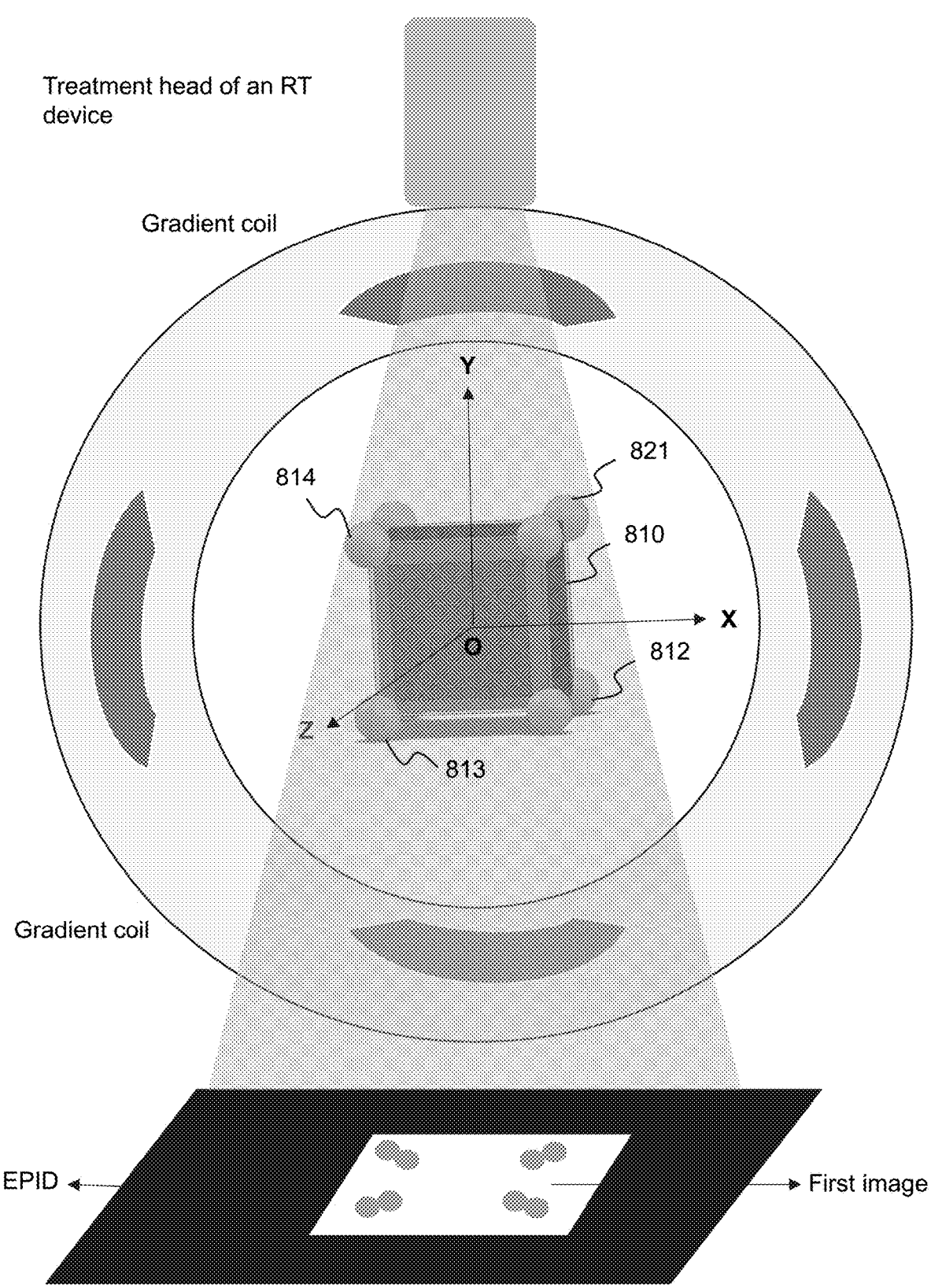
FIG. 8 is a schematic diagram illustrating an exemplary calibration of an integrated device according to some embodiments of the present disclosure.

The first image may be an image generated by an electronic portal imaging device (e.g., the EPID 160) using the first device. More descriptions regarding the generation of the first image by the EPID using the RT device may be found in FIG. 1 and the related descriptions thereof. In some embodiments, a format of the first image may include a Joint Photographic Experts Group (JPEG) image format, a Tagged Image File Format (TIFF) image format, a Graphics Interchange Format (GIF) image format, a Kodak Flash PiX (FPX) image format, a Digital Imaging and Communications in Medicine (DICOM) image format, etc. In some embodiments, the processing device 120 may use the first device to obtain the first image of the calibration phantom. For example, as shown in FIG. 8, the first image may be an image of the calibration phantom 810 obtained by the EPID after a treatment head of the RT device irradiates the calibration phantom 810.

The first center is a center of a treatment field of the RT device and/or a center of an imaging field center of the EPID. A treatment field, also referred to as a radiation field, is an irradiation range of the treatment head of the RT device when a radiative beam is directed at a target object. An imaging field is an imaging range corresponding to the first image of the calibration phantom on the EPID. For example, as shown in FIG. 8, the irradiation range when the treatment head of the RT device irradiates the calibration phantom may be indicated by the shaded region, and the first center may be a center O of the shaded region.

In some embodiments, the calibration phantom may include one or more spherical structures. In some embodiments, the one or more spherical structures may be symmetrically distributed around a geometric center of the calibration phantom. For example, as shown in FIG. 8, the calibration phantom 810 includes 8 spherical structures, e.g., spheres 811, 812, 813, 814, etc., which are symmetrically distributed around the geometric center of the calibration phantom 810. More descriptions regarding the calibration phantom may be found in FIGS. 9 to 17B and the related descriptions thereof.

In some embodiments, the processing device 120 may calibrate the first center of the first device based on the first image. Specifically, the processing device 120 may perform a mechanical adjustment on the RT device such that image (s) of the one or more spherical structures of the calibration phantom may be symmetrically distributed in the first image, thereby calibrating a position of the first center. For example, as shown in FIG. 8, the calibration phantom 810 includes 8 spherical structures symmetrically distributed around the geometric center of the calibration phantom 810 (e.g., the spheres 811, 812, 813, 814, etc.). The processing device 120 may mechanically adjust the RT device to achieve the symmetrical distribution of the 8 spherical structures in the first image. As another example, the calibration phantom may include a single spherical structure located at the geometric center of the calibration phantom, and the processing device 120 may perform a mechanical adjustment on the RT device to position the single spherical structure at a center of the first image. In some embodiments, the mechanical adjustment may be performed manually or automatically by equipment.

In 720, a second center of the second device may be calibrated using a calibration phantom. In some embodiments, operation 720 may be performed by the second calibration module 260.

The second center is a center of a gradient field domain of the MR device. More descriptions regarding the center of the gradient field domain may be found in operation 330 and the related description thereof. In some embodiments, the processing device 120 may use the calibration phantom to calibrate the second center of the second device, such that the second center of the MR device coincides with the first center of the RT device.

As shown in FIG. 7, in some embodiments, operation 720 may include one or more of the following sub-operations 722, 724, and 726.

In 722, a magnetic flux variation in at least one portion of a spatial region in at least one gradient direction of a gradient field domain of the second device may be measured using the calibration phantom. More descriptions regarding the measurement of the magnetic flux variation in at least one portion of the spatial region in at least one gradient direction of the gradient field domain of the second device may be found in operations 310 and 320 and the related descriptions thereof.

In 724, the second center of the second device may be determined based on the magnetic flux variation in the at least one portion of the spatial region in at least one gradient direction of the gradient field domain of the second device. More descriptions regarding the determination of the second center of the second device based on the magnetic flux variation in the at least one portion of the spatial region in at least one gradient direction of the gradient field domain may be found in operation 330 and the related descriptions thereof.

In 726, the second device may be calibrated based on the second center of the second device, such that the second center of the second device coincides with the first center of the first device.

In some embodiments, the processing device 120 may obtain a first offset between the first center and the second center. For example, the processing device 120 may obtain a first offset $(x\delta1, y\delta1, z\delta1)$ based on the coordinate $(x2, y2, z2)$ of a second center O2 and the coordinate $(x1, y1, z1)$ of a first center O1 in a same coordinate system, wherein $x\delta1=x2-x1$, $y\delta1=y2-y1$, $z\delta1=z2-z1$.

In some embodiments, the processing device 120 may perform a mechanical adjustment on the second device and/or the first device based on the first offset such that the second center coincides with the first center. For example, the processing device 120 may perform the mechanical adjustment on the second device by moving the second device by an offset of $(-x\delta1, -y\delta1, -z\delta1)$, thereby changing the position of the second center O2 from the coordinate $(x2, y2, z2)$ to the coordinate $(x1, y1, z1)$ of the first center O1. As another example, the processing device 120 may mechanically adjust the first device by moving the first offset of $(x\delta1, y\delta1, z\delta1)$, thereby changing the position of the first center O1 from the coordinate $(x1, y1, z1)$ to the coordinate $(x2, y2, z2)$ of the second center O2. More descriptions regarding causing the second center to coincide with the first center by performing the mechanical adjustment on the second device and/or the first device based on the first offset may be found in operation 340 and the relevant description thereof.

In some embodiments, the mechanical adjustment on the second device and/or the first device based on the first offset can cause the second center of the second device to coincide with the first center of the first device rapidly and accurately, such that calibration efficiency and accuracy can be improved.

In some embodiments, before calibrating the second center of the second device using the calibration phantom, the processing device 120 may move a reference center of the calibration phantom to the first center of the first device, such that the reference center of the calibration phantom coincides with the first center of the first device. In some embodiments, the reference center of the calibration phantom may be the geometric center of the calibration phantom. For example, the processing device 120 may move a reference center O' of the calibration phantom to the first center O1 of the first device, such that coordinate $(x3, y3, z3)$ of the reference center O' of the calibration phantom equals the coordinate $(x1, y1, z1)$ of the first center O1, i.e., $(x3, y3, z3)=(x1, y1, z1)$.

In some embodiments, after moving the reference center of the calibration phantom to the first center of the first device, the processing device 120 may obtain a second offset between the second center and the reference center of the calibration phantom. Specifically, the processing device 120 may obtain a second offset of $(x\delta2, y\delta2, z\delta2)$ based on the coordinate $(x2, y2, z2)$ of the second center O2 and the coordinate $(x3, y3, z3)$ of the reference center O' of the calibration phantom in a same coordinate system, wherein $x\delta2=x2-x3$, $y\delta2=y2-y3$, $z\delta2=z2-z3$.

In some embodiments, the processing device 120 may perform a mechanical adjustment on the second device and/or the first device based on the second offset such that the second center coincide with the first center. Specifically, the processing device 120 may adjust, based on the second offset, a relative position between the second device and the calibration phantom by adjusting a position of at least one of the second device or the first device, such that the second center coincide with the reference center of the calibration phantom. For example, the processing device 120 may perform the mechanical adjustment on the second device by moving the second device by an offset of $(-x\delta2, -y\delta2, -z\delta2)$, thus moving the position of the second center O2 from the coordinate $(x2, y2, z2)$ to the coordinate $(x3, y3, z3)$ of the reference center O' of the calibration phantom. As another example, the processing device 120 may mechanically adjust the first device by moving the first device by the second offset $(x\delta2, y\delta2, z\delta2)$, thus moving the position of the reference center O' of the calibration phantom from the coordinate $(x3, y3, z3)$ to the coordinate $(x2, y2, z2)$ of the second center O2. More descriptions regarding causing the second center to coincide with the first center by performing the mechanical adjustment on the second device and/or the first device based on the first offset may be found in operation 340 and the relevant description thereof.

In some embodiments, after moving the reference center of the calibration phantom to the first center of the first device, the processing device 120 may calibrate the second center of the second device based on the adjusted calibration phantom. More descriptions regarding calibrating the second center based on the adjusted calibration phantom may be found in FIG. 3 and the related descriptions thereof.

In some embodiments, through the mechanical adjustment based on the offset between the coordinate of the reference center of the calibration phantom and the coordinate of the center of the radiation field of the RT device in the MR-RT integrated device, the reference center of the calibration phantom can be caused to coincide with the center of the radiation field of the RT device. Then, based on the offset between the coordinate of the adjusted reference center of the calibration phantom and the mechanical center of the MR device in the MR-RT integrated device, the reference center of the calibration phantom can be moved to the mechanical center of the MR device. In this way, repeated movement of the MR device can be avoided, and efficiency of the mechanical adjustment can be improved.

In some embodiments, the calibration phantom used in operation 710 and the calibration phantom used in operation 720 may be the same or different. For example, the calibration phantom used in operation 710 and the calibration phantom used in operation 720 may be two calibration phantoms with different structures. As another example, the calibration phantom used in operation 710 and the calibration phantom used in operation 720 may be two calibration phantoms with a same structure. In some embodiments, if the calibration phantom used in operation 710 and the calibration phantom used in operation 720 are a same calibration phantom or two calibration phantoms with a same structure, the processing device 120 may calibrate the first center of the first device and the second center of the second device respectively based on different structures of the same calibration phantom or the two calibration phantoms with the same structure. For example, assuming the calibration phantom includes nine spherical structures, wherein eight of the nine spherical structures are similar to the spherical structures in the calibration phantom 810 shown in FIG. 8, and the other one of the nine spherical structures is located at the geometric center of the calibration phantom. In operation 710, the processing device 120 may calibrate the first center based on the eight spherical structures, and in operation 720, the processing device 120 may calibrate the second center based on the other one of the nine spherical structures located at the geometric center of the calibration phantom.

In some embodiments, by calibrating the first center of the first device and the second center of the second device respectively based on different structures of a same calibration phantom or two calibration phantoms with a same structure, efficiency of using the calibration phantom and calibration efficiency of the center of the gradient field domain of the integrated device can be improved.

It should be noted that the descriptions of processes 300 and 700 are merely illustrative and explanatory and do not limit the scope of the present disclosure. Those skilled in the art may make various modifications and changes to processes 300 and 700 under the guidance of the present disclosure. However, these modifications and changes are still within the scope of the present disclosure. For example, when performing the mechanical adjustment on the MR/RT device, adjustments may be made simultaneously to both the MR device and the RT device.

Figure 9:
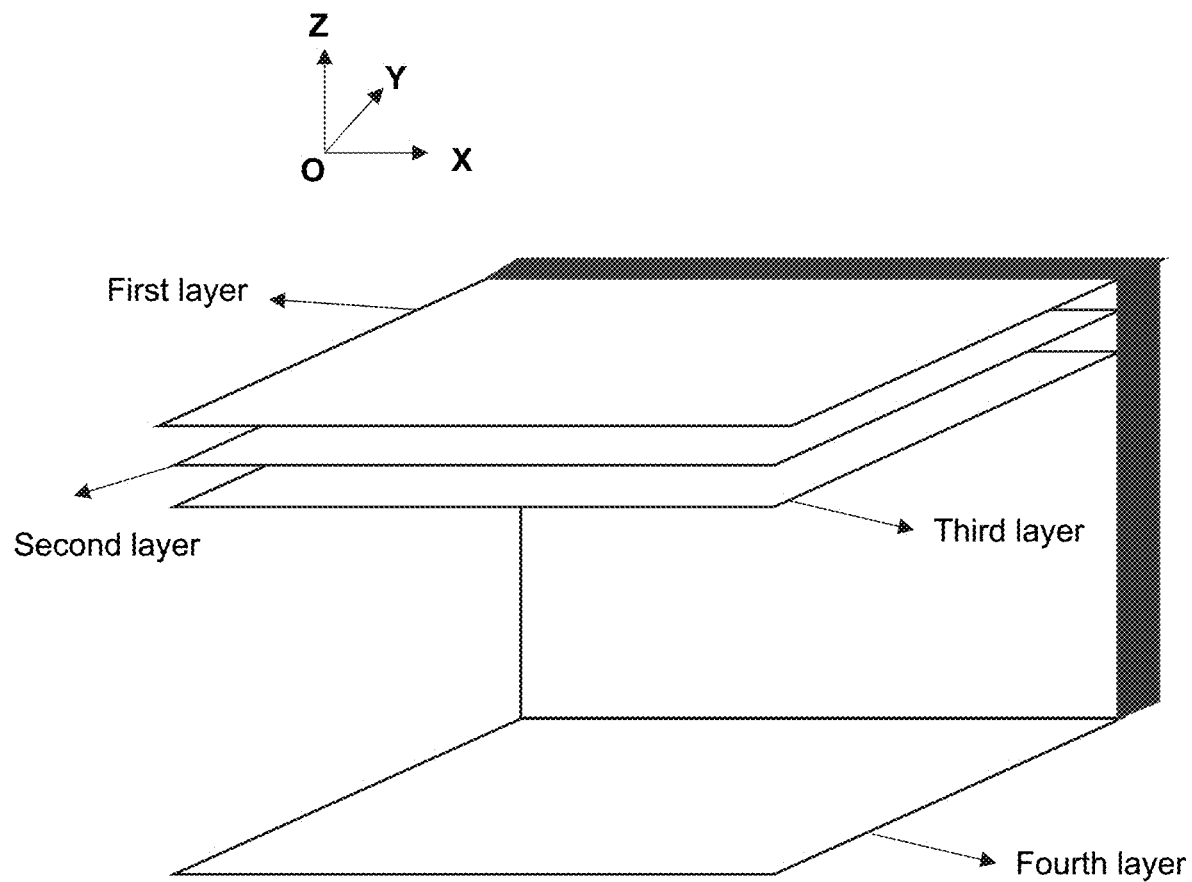
FIG. 9 is a schematic diagram illustrating an exemplary calibration phantom for calibrating an MR device according to some embodiments of the present disclosure.

FIG. 9 is a schematic diagram illustrating an exemplary calibration phantom for calibrating an MR device according to some embodiments of the present disclosure.

A calibration phantom is a phantom used for calibrating a field center of a medical device (e.g., an MR device, an integrated device, etc.) in the field of the medical device. In some embodiments, the calibration phantom may include one or more layers of coil arrays. As shown in FIG. 9, the calibration phantom may include four layers of coil arrays.

In some embodiments, the coil arrays may be a microelectro-mechanical system (MEMS).

In some embodiments, the one or more layers of coil arrays included in the calibration phantom may be used to measure magnetic flux variation(s) of an MR device (e.g., the MR device in process 300, the second device in process 700) in at least two gradient directions to calibrate centers of a gradient field domain of the MR device in the at least two gradient directions.

Merely by way of example, if the calibration phantom includes a single layer of coil arrays, the single lay of coil arrays may be used to measure magnetic flux variation(s) in two gradient directions (e.g., an X direction and a Y direction) on the single layer of coil arrays to calibrate the center of the gradient field domain of the MR device in the two gradient directions.

As another example, if the calibration phantom includes a multi-layer of coil arrays, the multi-layer of coil arrays may be used to measure magnetic flux variations in two gradient directions (e.g., the X direction and the Y direction) on each layer of the multi-layer of coil arrays and a magnetic flux variation in a direction (e.g., a Z direction) along which layers of the multi-layer of coil arrays are arranged to calibrate the center(s) of the gradient field domain of the MR device in three gradient directions (the X, Y, and Z directions).

More descriptions regarding measuring the magnetic flux variations of the MR device in at least two gradient directions based on the single layer of coil arrays or the multi-layer of coil arrays may be found in FIG. 3 and the related descriptions thereof.

In some embodiments, the calibration phantom may include a multi-layer of coil arrays arranged spaced apart from each other, and two adjacent layers of coil arrays of the multi-layer of coil arrays may be arranged opposite to each other.

In some embodiments, the multi-layer of coil arrays may be spaced at even intervals. In some embodiments, the interval between the multi-layer of coil arrays may be less than or equal to a calibration accuracy of the center of the gradient field domain in the Z direction. For example, if the calibration accuracy in the Z direction is 0.5 mm, then the interval between the multi-layer of coil arrays may be less than or equal to 0.5 mm. In some embodiments, the multi-layer of coil arrays spaced at even intervals may be used to determine the layer of coil arrays where the minimal magnetic flux variation in the Z direction occurs, such that a position with the minimal magnetic flux variation may be determined.

In some embodiments, the multi-layer of coil arrays may be spaced at uneven intervals. In some embodiments, the multi-layer of coil arrays spaced at uneven intervals may be used to fit a distribution of magnetic flux variations in the Z direction, and a position where the magnetic flux variation is zero may be determined. More descriptions regarding the determination of the position with the minimum magnetic flux variation in the Z direction based on the multi-layer of coil arrays may be found in operation 330 and the related descriptions thereof.

In some embodiments of the present disclosure, based on the arrangement of coils on the coil arrays included in the calibration phantom and the spacing manner of the multi-layer of coil arrays, magnetic flux variations of the MR device in a plurality of gradient directions can be measured, such that dimensionality and flexibility of the measurement can be enhanced.

In some embodiments, at least one of the coil arrays included in the calibration phantom may include a coil carrier and a plurality of coils. A coil carrier is a support structure for the coil(s). In some embodiments, the coil carrier may support one or more coil arrays. In some embodiments, the coil carrier may be a single-sided printed circuit board (PCB) or a double-sided PCB. In some embodiments, one or more coil carriers may be arranged along a third direction in a 3D coordinate system. For example, as shown in FIG. 9, four coil carriers used to support a four-layer coil arrays are arranged along the Z direction, wherein a first layer, a second layer, a third layer, and a fourth layer of the four-layer coil arrays are supported by PCBs for each respective layer.

In some embodiments, a shape of the plurality of coils may include but is not limited to a rectangle, a circle, a polygon, etc. The plurality of coils may include one or more turns. In some embodiments, a multi-turn coil may exhibit a spiral distribution within at least a portion of the coil. For example, as shown in FIG. 12, coils 1210 and 1220 are rectangular coils, and the multi-turn coil inside the rectangular coil may exhibit a spiral distribution across an entire region in coil 1210 and only in a peripheral region of coil 1220. Coil 1230 is a circular coil, and the multi-turn coil inside the circular coil 1230 may exhibit a spiral distribution in a peripheral region of the circular coil 1230. Coil 1240 is a single-turn hexagonal coil.

In some embodiments, two endpoints of each of the plurality of coils may be connected to a positive terminal and a negative terminal of a circuit, respectively. In some embodiments, the two endpoints of each of the plurality of coils may be distributed on two sides of a double-sided coil carrier, respectively. For example, as shown in FIG. 12, the multi-turn coil (e.g., 1210, 1220, and 1230) and a connection lead-out line of one endpoint of the multi-turn coil may overlap, and the two endpoints may be distributed on the two sides of the double-sided coil carrier to avoid a short circuit between the multi-turn coil and the lead-out line of the endpoint. In some embodiments, the multi-turn coil may be distributed on the two sides of the double-sided coil carrier. For example, the multi-turn spiral coil 1210 in FIG. 12 may be alternately distributed on the two sides of the double-sided coil carrier.

In some embodiments, the two endpoints of each of the plurality of coils may be distributed on one side of a single-sided coil carrier. For example, as shown in FIG. 12, a connection lead-out line of the single-turn hexagonal coil 1240 and two endpoints of the single-turn hexagonal coil 1240 do not overlap, and the single-turn hexagonal coil 1240 and the two endpoints may be distributed on one side of the single-sided coil carrier.

In some embodiments, a size of each of the plurality of coils may have a preset value (e.g., between 0.1 mm and 0.5 mm). For example, lengths and widths of the rectangular coils 1210 and 1220 in FIG. 12 may be 0.2 mm. As another example, a diameter of the circular coil 1230 may be 0.5 mm. A length of a side of the regular hexagonal coil 1240 in FIG. 12 may be 0.2 mm. In some embodiments, a size of each coil in a layer of coils may be smaller than or equal to a calibration accuracy of the center of the gradient field domain in the X and Y directions.

In some embodiments, each coil array included in the calibration phantom may be arranged along at least one of a first direction or a second direction in the 3D coordinate system.

FIGS. 10A-10D are schematic diagrams illustrating exemplary coil arrays according to some embodiments of the present disclosure.

Figure 10A:
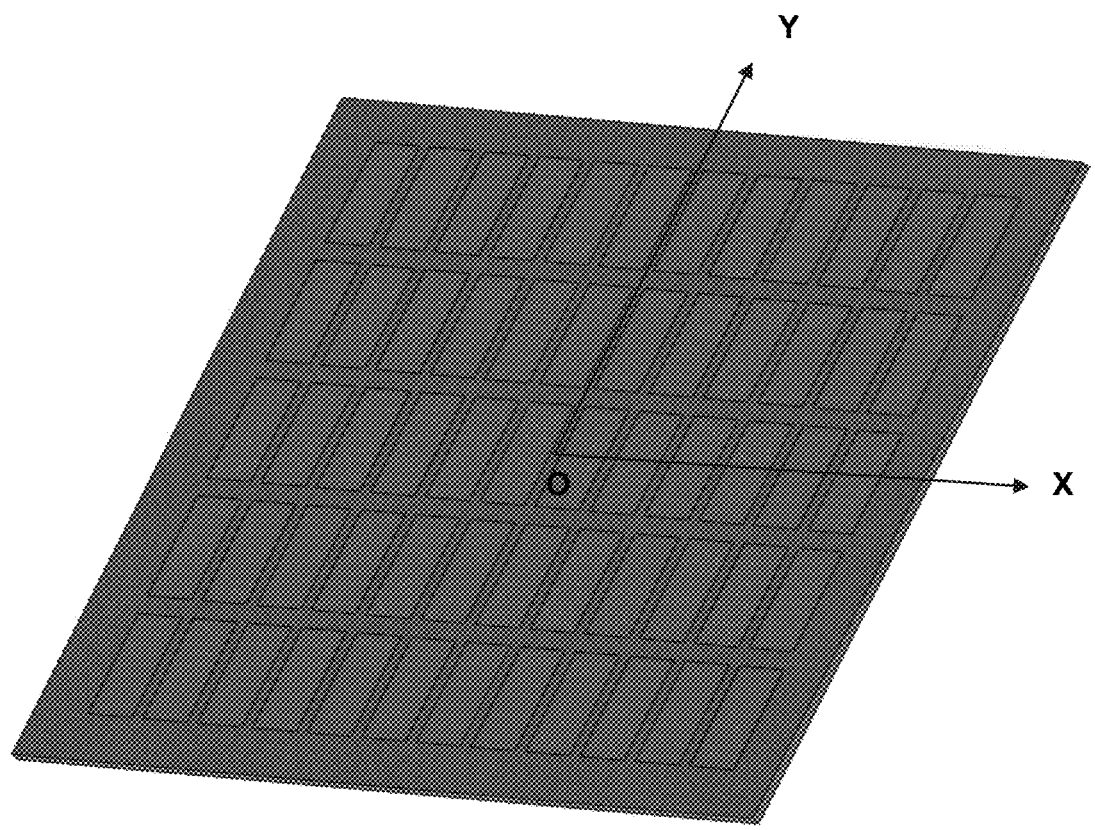
FIGS. 10A-10D are schematic diagrams illustrating exemplary coil arrays according to some embodiments of the present disclosure.

In some embodiments, at least one coil carrier may support a coil array. In some embodiments, at least one layer of coil array of the one or more layers of coil arrays of the calibration phantom may include a plurality of coils, and the plurality of coils may be arranged to form a flat combination. As shown in FIG. 10A, a coil carrier may support 60 coils arranged along an X direction and a Y direction in 12 columns and 5 rows respectively. More descriptions regarding the calibration of the center of the gradient field domain in the first and second gradient directions may be found in FIG. 3 and the related descriptions thereof.

In some embodiments, the plurality of coils may include at least a first coil and a second coil. In some embodiments, a size of the first coil may be larger than a size of the second coil. In some embodiments, the first coil may be distributed in an edge region of the at least one layer of coil array for calibrating a symmetry of the gradient field. The symmetry of the gradient field refers to magnetic flux variations in the gradient field being centrally symmetric around a center of the gradient field domain. Accordingly, in some embodiments, the first coil may be centrally symmetrically distributed on the at least one layer of coil array, therefore, it may be determined that the magnetic flux variations measured by at least two first coils centrally symmetrically distributed are the same in magnitude but opposite in polarity. It may be understood that compared to the second coil, the first coil may be larger in size and may induce more magnetic flux variations, therefore, an error caused by non-uniformity of the gradient field can be reduced.

In some embodiments, the second coil may be distributed in a central region of at least one layer of the coil array. It may be understood that when a geometric center of a calibration phantom is placed at a mechanical center of an MR device, the central region of the at least one layer of coil array may include the center of the gradient field domain. The relatively smaller size of the second coil can improve the calibration accuracy of the center of the gradient field domain on a plane of the coil array.

Figure 10B:
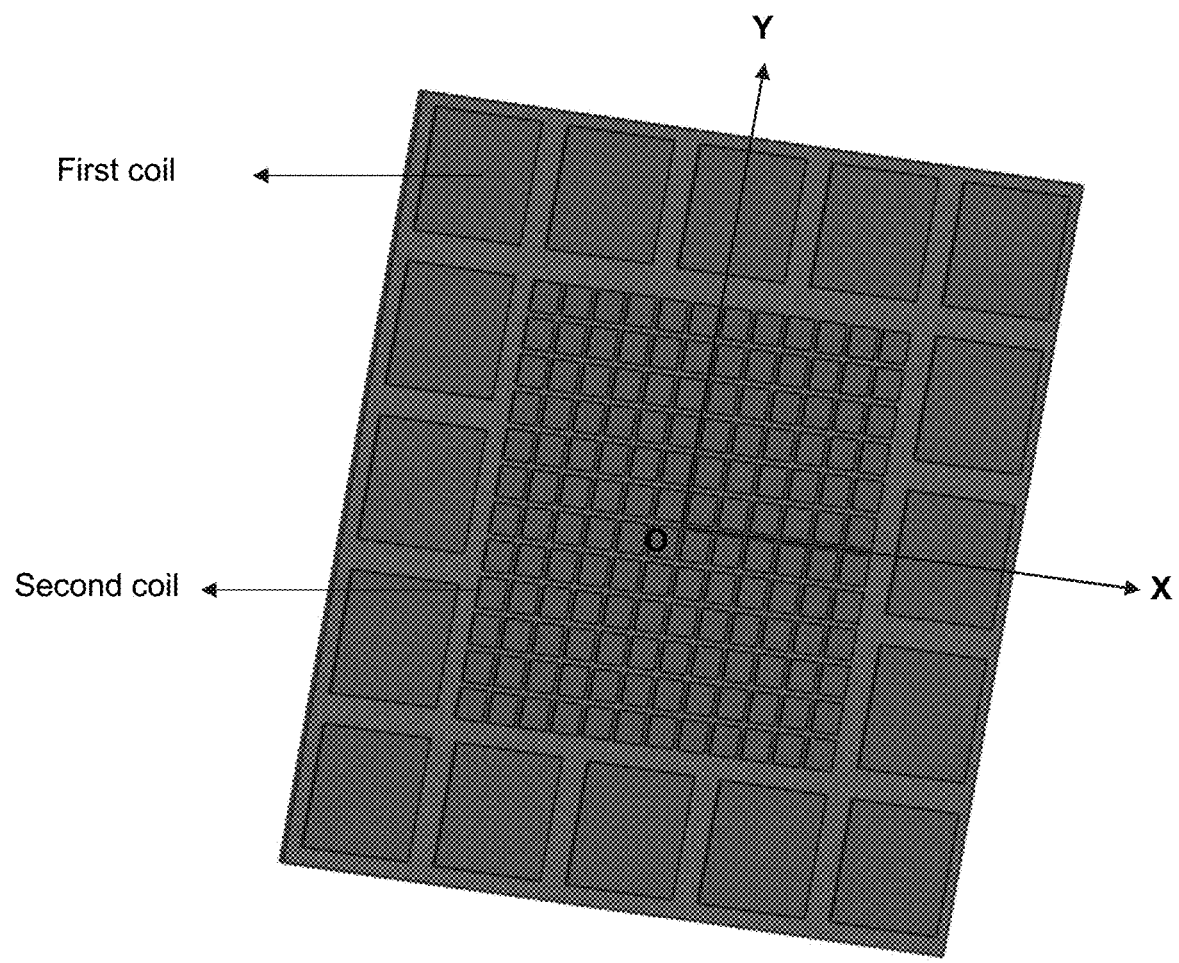

As shown in FIG. 10B, the coil array may include 16 first coils and 144 second coils arranged in a 12×12 pattern. Specifically, the 16 first coils may be centrally symmetrically distributed in the edge region of the coil array, while the 44 second coils arranged in the 12×12 pattern may be distributed in the central region of the coil array.

In some embodiments of the present disclosure, by obtaining higher magnetic flux induction accuracy based on the first coil(s) in the edge region of the coil array and obtaining higher spatial resolution accuracy based on the second coil(s) in the central region of the coil array, the symmetry and the center of the gradient field domain can be calibrated simultaneously, saving manufacturing costs and improving calibration efficiency.

Figure 10C:
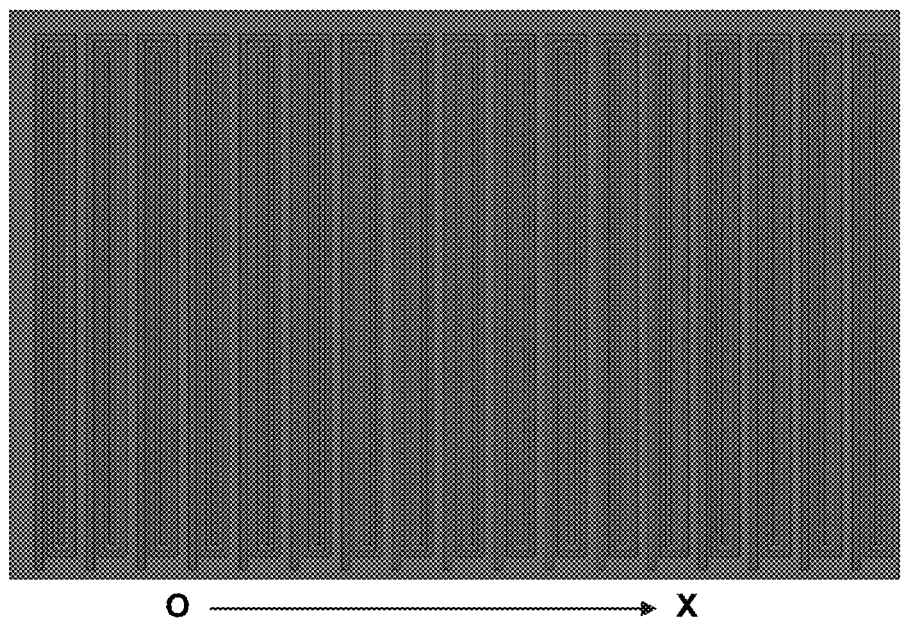
Figure 10D:
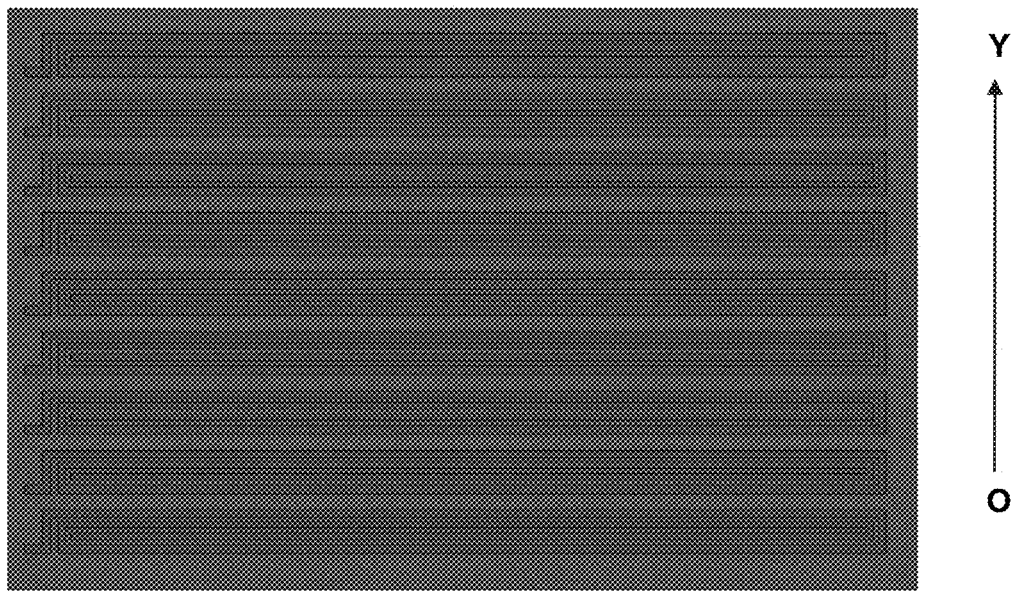

In some embodiments, the plurality of coils may be arranged along a first gradient direction or a second gradient direction of the at least two gradient directions to facilitate the calibration of the center of the gradient field domain in the first gradient direction or the center of the gradient field domain in the second gradient direction. As shown in FIG. 10C, the plurality of coils may be arranged along the X direction for calibrating a center of the gradient field domain in the X direction. Similarly, as shown in FIG. 10D, the plurality of coils may be arranged along the Y direction for calibrating a center of the gradient field domain in the Y direction.

In some embodiments of the present disclosure, based on the arrangement manner of the plurality of coils on the coil array along the first gradient direction and the second gradient direction, the magnetic flux variations in the gradient field domain of the MR device may be measured in the first and second gradient directions, respectively, facilitating the determination of the position with the minimal magnetic flux variation, thus improving the calibration efficiency of the center of the gradient field domain.

In some embodiments, one or more layers of coil arrays of the calibration phantom may include at least one set of coils. In some embodiments, the at least one set of coils may include two layers of coils. For example, as shown in FIG. 9, the at least one set of coils may include a first layer of coil arrays and a second layer of coil arrays.

In some embodiments, the two layers of coils may be arranged along the first gradient direction and the second gradient direction, respectively, for calibrating the center of the gradient field domain in the first gradient direction and the second gradient direction, respectively. For example, the first layer of coil arrays and the second layer of coil arrays in FIG. 9 may be the coil arrays shown in FIG. 10C and FIG. 10D, respectively, where coils of the two layers of coil arrays are arranged along the X direction and the Y direction, respectively, for calibrating the center of the gradient field domain in the X direction and the center of the gradient field domain in the Y direction.

In some embodiments, the at least one coil carrier may support two coil arrays. In some embodiments, the two coil arrays may be arranged along the first and second directions respectively, forming two layers of coils. For example, the two coil carriers may support the first layer of coil arrays and the second layer of coil arrays, respectively. As another example, two sides of one coil carrier may support the first layer of coil arrays and the second layer of coil arrays respectively.

In some embodiments of the present disclosure, by arranging different layers of coil arrays along different gradient directions, a single layer of coil arrays may only calibrate the center of the gradient field domain in one gradient direction, reducing mutual interference between different gradient fields (e.g., during simultaneous switching of gradient fields).

Figure 11A:
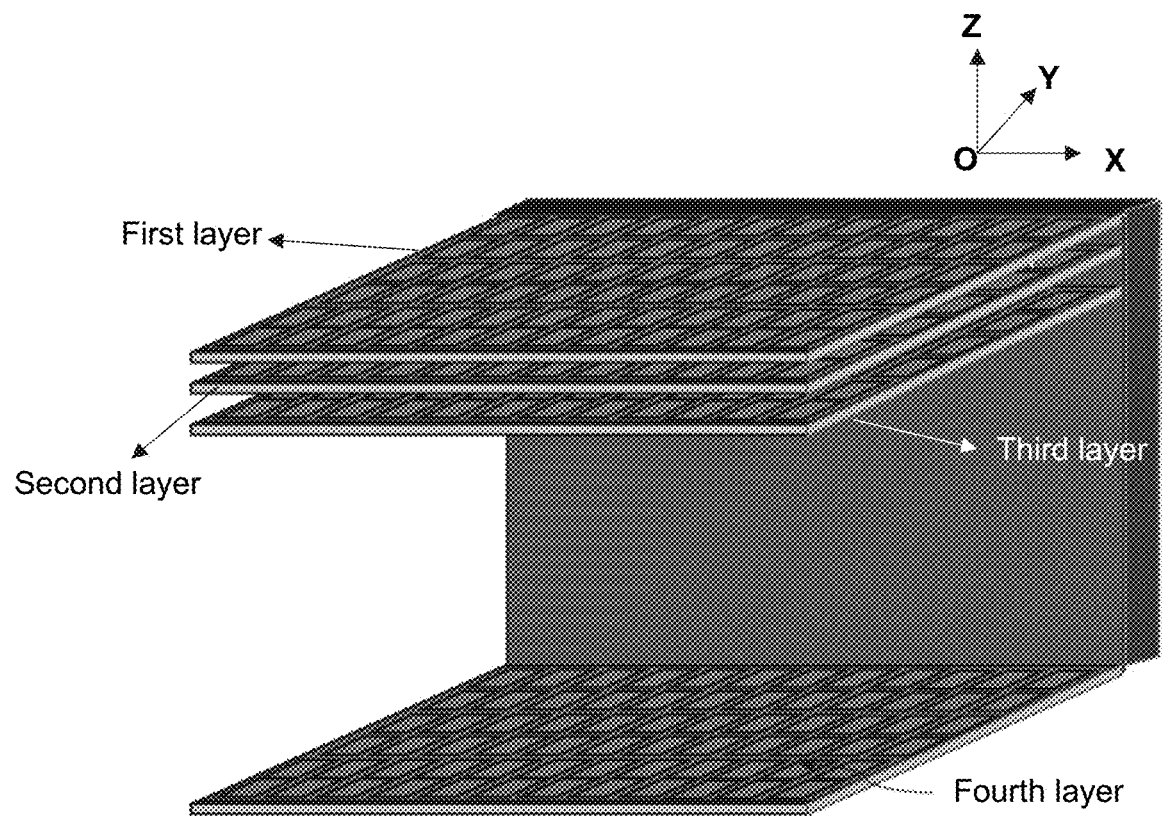
FIGS. 11A-11B are schematic diagrams illustrating exemplary multi-layer coils according to some embodiments of the present disclosure.
Figure 11B:
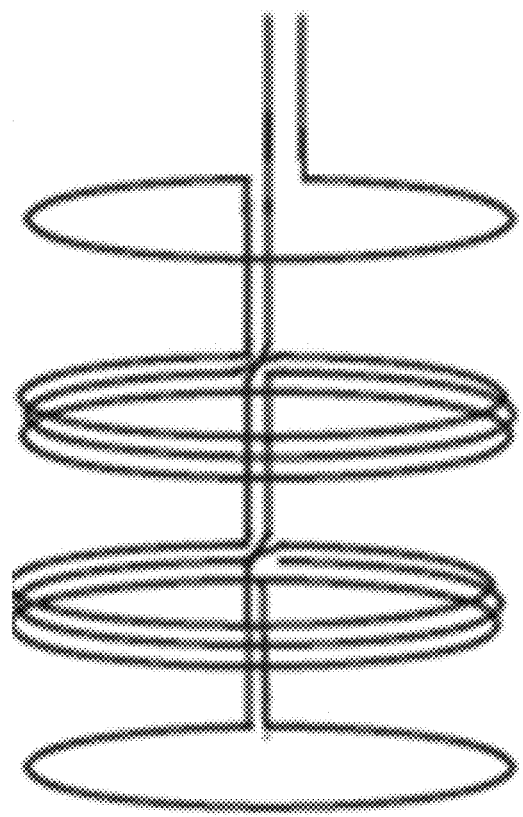

FIGS. 11A-11B are schematic diagrams illustrating exemplary multi-layer coils according to some embodiments of the present disclosure.

In some embodiments, one or more layers of coil arrays of the calibration phantom may include multi-layer coils or a plurality of sets of coils for calibrating a center of a gradient field domain in a third gradient direction of at least two gradient directions. As shown in FIG. 11A, a multi-layer of coil arrays may include four layers of coils. In this case, the magnetic flux variations in the Z direction for a second layer of coils and a third layer of coils may be positive and negative, respectively, and it may be determined that center of the gradient field domain in the Z direction may be between the second layer of coils and the third layers of coils.

In some embodiments, the processing device 120 may further fit a distribution of magnetic flux variations in the third gradient direction (e.g., the Z direction) based on the multi-layer coils, thereby determining a position where the magnetic flux variation is zero and designating the position as the center of the gradient field domain in the third gradient direction.

In some embodiments of the present disclosure, through the arrangement manner of the multi-layer coils or the plurality of sets of coils on the coil array, the center of the gradient field domain in the third gradient direction may be determined based on a symmetry of a magnetic field, thereby enhancing the dimensionality of the calibration.

In some embodiments, at least one coil may be distributed across at least two layers of coil arrays for calibrating the center of the gradient field domain in the third gradient direction of the at least two gradient directions. As shown in FIG. 11B, a multi-turn coil may be distributed across four layers of coil arrays (not shown in FIG. 11B) for calibrating the center of the gradient field domain in the Z direction. In some embodiments, at least one coil carrier may support a coil array. In some embodiments, each coil in a coil array may be distributed across two or more layers of coils. The multi-turn coil in FIG. 11B may be considered as a coil array including four coils, and the four coils may be respectively distributed on four coil carriers (not shown in FIG. 11B).

In some embodiments of the present disclosure, by distributing at least one coil across at least two layers of coil arrays, a count of coils can be reduced, saving costs. More descriptions regarding the calibration of the center of the gradient field domain in the third gradient direction may be found in operation 330 and the related descriptions thereof.

Figure 13:
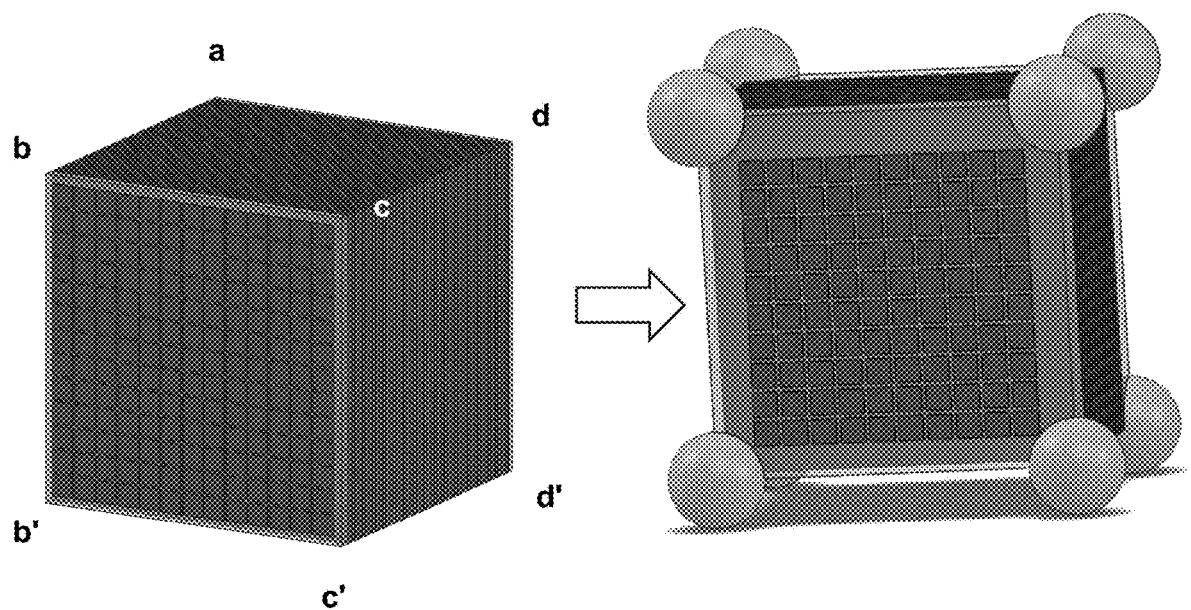
FIG. 13 is a schematic diagram illustrating an exemplary calibration phantom for calibrating an integrated device according to some embodiments of the present disclosure.

FIG. 13 is a schematic diagram illustrating an exemplary calibration phantom for calibrating an integrated device according to some embodiments of the present disclosure. In some embodiments, the calibration phantom may include one or more spherical structures, a housing, and/or an isocenter marking located on a surface of the housing.

In some embodiments, the one or more spherical structures may include at least one of a solid spherical structure or a hollow spherical structure. In some embodiments, the one or more spherical structures may have a relatively high absorption rate for radiation. The one or more spherical structures may include a high atomic number material, such as a dense alloy. In some embodiments, the one or more spherical structures included in the calibration phantom may be symmetrically distributed along a geometric center of the calibration phantom. In some embodiments, the one or more spherical structures may be distributed in an outer contour region of the calibration phantom. For example, if the calibration phantom is a cuboid, the calibration phantom may include at least four spherical structures, and any two of the at least four spherical structures may be distributed at symmetric corners of the calibration phantom. As shown in FIG. 13, two of four spherical structures are distributed at symmetric corners b' and d, while the other two of the four spherical structures are distributed at symmetric corners b and d'. Eight spherical structures are distributed at corners a, a' (not shown in FIG. 13), b, b', c, c', d, and d'.

Figure 14:
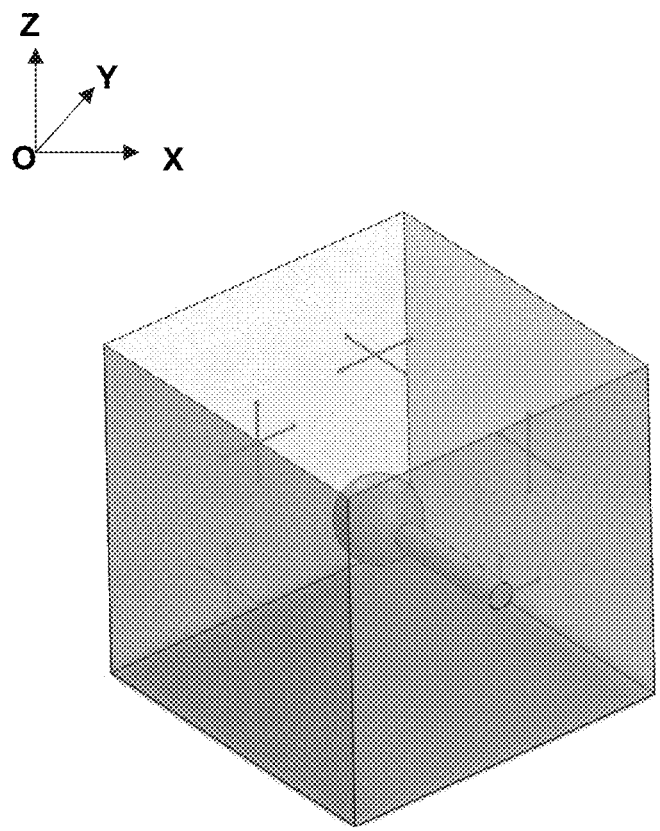
FIG. 14 is a schematic diagram illustrating another exemplary calibration phantom for calibrating an integrated device according to some embodiments of the present disclosure.

FIG. 14 is a schematic diagram illustrating another exemplary calibration phantom for calibrating an integrated device according to some embodiments of the present disclosure. In some embodiments, one or more spherical structures included in the calibration phantom may be distributed in an internal region of the calibration phantom. As shown in FIG. 14, one spherical structure may be distributed at a geometric center of the internal region of the calibration phantom. In some embodiments, the one or more spherical structures may be used to calibrate a center of a radiation field of an RT device and/or a mechanical center of an MR device. More descriptions regarding the calibration of the center of the radiation field of the RT device and the mechanical center of the MR device may be found in operations 710 and 720 and the relevant descriptions thereof.

In some embodiments, the calibration phantom may include a housing, where the housing may include one or more planar structures. In some embodiments, the housing may include an organic material, such as epoxy resin. In some embodiments, the housing may be used to accommodate one or more layers of coil arrays, one or more coil carriers, and/or one or more spherical structures. In some embodiments, the housing may be open. For example, as shown in FIG. 11A, the housing of the calibration phantom may include a plane in an OXY direction, which may be used to accommodate four layers of coil arrays and four coil carriers. In some embodiments, the housing may be closed. For example, as shown in FIG. 13, the housing of the calibration phantom may include 6 planes, forming a closed cuboid, which may be used to accommodate multi-layer of coil arrays, a plurality of coil carriers, and eight spherical structures.

Figure 17A:
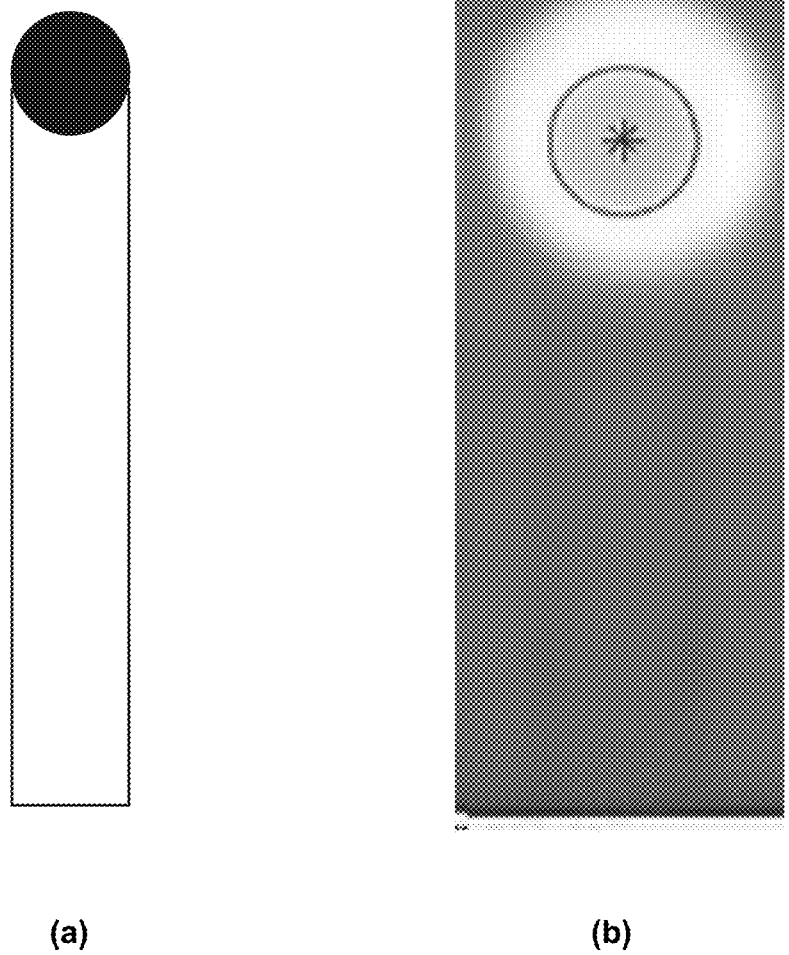
FIGS. 17A-17B are schematic diagrams illustrating another exemplary calibration phantom for calibrating an integrated device according to some embodiments of the present disclosure.

In some embodiments, the calibration phantom may include an isocenter marking on the surface of the housing. An isocenter marking may include line segments marking a center of the housing. In some embodiments, the isocenter marking may include at least two intersecting line segments. For example, the isocenter marking may include two intersecting line segments resembling a crosshair ("+"). As another example, the isocenter marking may include six intersecting line segments resembling a sign of "Ж". The center of the housing may be an intersection point of at least two intersecting line segments. For example, as shown in FIG. 14, six crosshairs ("+") may be used to mark six centers of the housing. As another example, as shown in FIG. 15, one crosshair ("+") may be used to mark one center of the housing. In another example, as shown in FIG. 16B, each side surface of the housing includes a crosshair ("+") for marking a geometric center of the side surface. In yet another example, as shown in FIG. 17A, the sphere on the right includes a sign of "✲" for marking the center of the housing.

In some embodiments, the isocenter marking on the surface of the housing may be used to assist in placing the calibration phantom at the mechanical center of the MR device and/or the RT device. Specifically, in some embodiments, the center(s) of the housing may be used to determine the geometric center of the calibration phantom. As shown in FIG. 14, a line connecting centers of two side surfaces of the housings on an OXY plane may be used to determine a Z-coordinate of the geometric center of the calibration phantom. Similarly, a line connecting centers of two side surfaces of the housings on an OXZ plane may be used to determine a Y-coordinate of the geometric center of the calibration phantom, and a line connecting centers of two side surfaces of the housings on an OYZ plane may be used to determine an X-coordinate of the geometric center of the calibration phantom. Thus, a position of the geometric center of the calibration phantom may be determined. Furthermore, in some embodiments, the geometric center of the calibration phantom may be placed at the mechanical center of the MR device and/or the center of the radiation field of the RT device.

In some embodiments, by calibrating the MR-RT device using a calibration phantom with one or more spherical structures, calibration of the center of the gradient field domain of the MR device and the center of the radiation field of the RT device can be achieved based on one calibration phantom, improving calibration efficiency of the integrated device.

FIG. 15 is a schematic diagram illustrating another exemplary calibration phantom for calibrating an integrated device according to some embodiments of the present disclosure. In some embodiments, a housing (e.g., a portion used for measuring an isocenter of an RT device) of the calibration phantom may have a shape of a bucket (referred to as a BB phantom). The bucket-shaped housing may include a plurality of marker points made of a heavy metal with strong radiation absorption capability such as lead. In some embodiments, the calibration phantom with the bucket-shaped housing may be an MR-RT reusable structure, capable of calibrating a mechanical center of the MR device and a center of a radiation field of the RT device. For example, in the sub-figure (a) of FIG. 15, the calibration phantom with the bucket-shaped housing includes an isocenter marking 1510 and a plurality of marker points 1521, 1522, 1523, and 1524, etc.

In some embodiments, the processing device 120 may rotate the calibration phantom with the bucket-shaped housing along an axis relative to the RT device and obtain a plurality of images of the calibration phantom with the bucket-shaped housing at different angles through an EPID. The plurality of images may be used to determine a correspondence relationship between a spatial coordinate and an image coordinate of the EPID. For example, the sub-figures (b) and (c) of FIG. 15 show images of the calibration phantom with the bucket-shaped housing at two different angles. It may be observed that distributions of marker points on the two images are different, indicating that shooting angles of the two images are different.

FIGS. 16A-16B are schematic diagrams illustrating another exemplary calibration phantom for calibrating an integrated device according to some embodiments of the present disclosure. In some embodiments, a housing of the calibration phantom may include a crosshair ("+") structure. The processing device 120 may cause the crosshair structure to rotate relative to an RT device by rotating a collimator in the RT device and obtain a plurality of images of the calibration phantom at different angles using an EPID. The plurality of images may be used to determine a projection of a rotation axis of the collimator on an image of the EPID. For example, as shown in FIG. 16A, the sub-figure (a) of FIG. 16A is a schematic diagram of a calibration phantom including the crosshair structure, and the sub-figure (b) of FIG. 16A is an image of the calibration phantom. In some embodiments, a material of the crosshair may be a high-density metal or the like.

In some embodiments, the crosshair structure may be attached to the housing of an MR gradient isocenter calibration phantom. An MR gradient isocenter calibration phantom is a calibration phantom whose geometric center coincides with a center of a gradient field of the MR device. For example, as shown in FIG. 16B, the calibration phantom is a regular hexahedron, making it an MR gradient isocenter calibration phantom. A crosshair structure is attached to each side surface of the housing of the calibration phantom. As shown in the sub-figure (a) of FIG. 16B, the two intersecting lines in each crosshair structure may be parallel to corresponding edges of each surface; in the sub-figure (b) of FIG. 16B, the two intersecting lines in each crosshair structure may be diagonals of a corresponding surface.

Figure 17B:
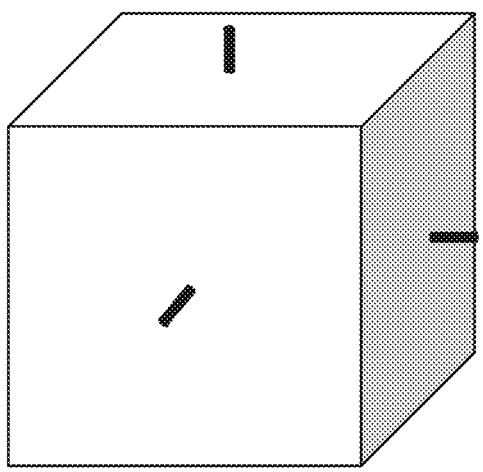

FIGS. 17A-17B are schematic diagrams illustrating another exemplary calibration phantom for calibrating an integrated device according to some embodiments of the present disclosure. In some embodiments, the calibration phantom may include a pen-shaped tip and a rod-shaped structure connected to the pen-shaped tip. The pen-shaped tip may include a small sphere made of a high-density material (e.g., a high-density metal), and the rod-shaped structure may be made of a low-density material. The sub-figure (a) of FIG. 17A shows the pen-shaped tip and the connected rod-shaped structure, where the dark sphere in the pen-shaped tip may be made of the high-density metal, and the rod-shaped structure may be made of the low-density material. The sub-figure (b) of FIG. 17A shows images of the pen-shaped tip and the connected rod-shaped structure obtained using an EPID. It may be observed that the sphere includes an isocenter marking resembling a sign of "✳", and there is a clear boundary between the image of the sphere and the image of the rod-shaped structure.

In some embodiments, the pen-shaped tip and the connected rod-shaped structure may form a pen-shaped probe (as shown in the sub-figure (a) of FIG. 17A). The calibration phantom may include one or more pen-shaped probes. In some embodiments, a plurality of pen-shaped probes may be located at various positions, such as a front, a back, a left, and a right of the calibration phantom. As shown in FIG. 17B, the calibration phantom may be a regular hexahedron structure, and each of at least three surfaces of the calibration phantom has a pen-shaped probe oriented perpendicular to the surface and passing through a geometric center of the surface.

Some potential beneficial effects of the embodiments of the present disclosure include, but are not limited to: (1) by switching the electrical current of the gradient coils to switch the gradient field corresponding to at least one gradient direction, using a magnetic flux measurement component to obtain the magnetic flux variation of the gradient field in at least one gradient direction, and determining, based on the linear symmetry of the gradient field, the position with the minimal magnetic flux variation as the center of the gradient field domain, thus, magnetic field variation in the gradient field can be achieved without the need of a field-raising/field-lowering operation on the main magnetic field, and the center of the gradient field domain can be calibrated; (2) by calibrating the first center of the first device and the second center of the second device respectively based on different structures of a same calibration phantom, and causing the second center to coincide with the first center, the efficiency of using the calibration phantom and the calibration efficiency of the integrated device field center are improved; (3) by determining the axial offset of the gradient field domain based on the distribution of the magnetic flux variation in at least one gradient direction in at least one portion of a spatial region within the gradient field, the axial offset of the gradient field domain is eliminated in calibrating the center of the gradient field domain; (4) the one or more layers of coil arrays in the calibration phantom may be used to measure the magnetic flux variation of the MR device in multiple gradient directions based on the arrangement manner of coils on the coil arrays and the distribution between multi-layer of coil arrays, thereby increasing the dimensionality and flexibility of the measurement; (5) by using the calibration phantom with sphere structures for calibrating the RT device, the calibration of the center of the gradient field domain of the MR device and the center of the radiation field of the RT device based on a same calibration phantom can be achieved, and the calibration efficiency of the integrated device can be improved. It should be noted that different embodiments may result in different beneficial effects, and in different embodiments, the potential beneficial effects may be any combination of the above or any other possible beneficial effects.

The basic concepts have been described above, and it is apparent that to a person skilled in the art, the above detailed disclosure is intended as an example only and does not constitute a limitation of the present disclosure. Although not expressly stated herein, various modifications, improvements, and amendments may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment," "one embodiment," and/or "some embodiments" are meant to refer to a certain feature, structure, or characteristic associated with at least one embodiment of the present disclosure. Accordingly, it should be emphasized and noted that "an embodiment" or "one embodiment" or "an alternative embodiment" mentioned two or more times in different places in the present disclosure do not necessarily refer to the same embodiment. Furthermore, certain features, structures, or characteristics in one or more embodiments of the present disclosure may be suitably combined.

Furthermore, unless expressly stated in the claims, the order of processing elements and sequences, the use of numerical letters, or the use of other names described herein are not intended to limit the order of the processes and methods of the present disclosure. Although a number of embodiments of the present disclosure currently considered useful are discussed in the above disclosure by way of various examples, it should be understood that such details serve illustrative purposes only, and that the appended claims are not limited to the disclosed embodiments; rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the present disclosure, and thus aid in the understanding of one or more embodiments of the present disclosure, the preceding description of embodiments of the present disclosure sometimes combines multiple features into a single embodiment, accompanying drawings, or description thereof. However, this way of disclosure does not imply that the subject matter of the present disclosure requires more features than those mentioned in the claims. Rather, claimed subject matter may lie in less than all features of a single foregoing disclosed embodiment.

In some embodiments, numeric values describing the composition and quantity of attributes are used in the description. It should be understood that such numeric values used for describing embodiments may be modified with qualifying terms such as "about," "approximately," or "generally." Unless otherwise stated, "about," "approximately," or "generally" indicates that a variation of ±20% is permitted in the described numbers. Accordingly, in some embodiments, the numerical parameters used in the disclosure and claims are approximations, which may change depending on the desired characteristics of the individual embodiment. In some embodiments, the numerical parameters should take into account a specified number of valid digits and employ a general manner of bit retention.

Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents or the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

Finally, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A method for calibrating a medical device implemented on a computing device having one or more processors and one or more storage devices, the medical device including a magnetic resonance (MR) device, the method comprising:
    switching a gradient field in at least one gradient direction of the MR device;
    obtaining, by using a magnetic flux measurement component, a magnetic flux variation in the at least one gradient direction in at least one portion of a spatial region within a gradient field domain of the MR device;
    determining, based on the magnetic flux variation, a center of the gradient field domain of the MR device; and
    performing, based on the center of the gradient field domain, a mechanical adjustment on the MR device to locate the center of the gradient field domain at a target position, or adjusting, based on the center of the gradient field domain, an image reconstruction process performed on data generated by the MR device to correct or eliminate an impact of inaccuracy of the center of the gradient field domain on an image reconstructed based on the data.

2. The method of claim 1, wherein the target position is a center of a radiation field of an RT device in an MR-RT device that comprises the MR device.

3. The method of claim 1, wherein the adjusting, based on the center of the gradient field domain, an image reconstruction process performed on data generated by the MR device includes:
    calibrating, based on a position deviation between the center of the gradient field domain and the target position, an image coordinate system used in the image reconstruction process.

4. The method of claim 1, further comprising:
    placing the magnetic flux measurement component in a mechanical center of the MR device.

5. The method of claim 1, wherein the magnetic flux measurement component includes a three-dimensional (3D) magnetic induction coil array.

6. The method of claim 1, wherein the switching a gradient field in at least one gradient direction of the MR device includes:
    switching an electric current of a gradient coil of the MR device corresponding to the at least one gradient direction, wherein the at least one gradient direction includes at least one of an X direction, a Y direction, or a Z direction.

7. The method of claim 6, wherein the switching an electric current of a gradient coil of the MR device corresponding to the at least one gradient direction includes:
    switching the gradient field in any one of the at least one gradient direction, and reversing the gradient field in another one of the at least one gradient direction after restoring the gradient field.

8. The method of claim 6, wherein the switching an electric current of a gradient coil of the MR device corresponding to the at least one gradient direction includes:
    switching gradient fields in any two or more of the at least one gradient direction simultaneously.

9. The method of claim 1, wherein the determining, based on the magnetic flux variation, a center of the gradient field domain of the MR device includes:
    obtaining, based on the magnetic flux variation, a distribution of the magnetic flux variation in the at least one portion of the spatial region within the gradient field domain;
    determining, based on the distribution of the magnetic flux variation, a position with a minimal magnetic flux change in the at least one portion of the spatial region within the gradient field domain; and
    designating the position with the minimal magnetic flux change as the center of the gradient field domain of the MR device.

10. The method of claim 1, further comprising:
    determining, based on the distribution of the magnetic flux variation, an axial offset of the gradient field; and
    performing, based on the axial offset of the gradient field, the mechanical adjustment on the MR device.

11. A method for calibrating a medical device implemented on a computing device having one or more processors and one or more storage devices, the medical device including a first device or a second device combined with the first device, the method comprising calibrating a second center of the second device using a calibration phantom, including:
    obtaining, by using the calibration phantom, a magnetic flux variation in at least one gradient direction in at least one portion of a spatial region within a gradient field domain of the second device;
    determining, based on the magnetic flux variation, the second center of the second device; and
    performing, based on the second center of the second device, a calibration on the second device to cause the second center of the second device to coincide with the first center of the first device.

12. The method of claim 11, further comprising:
    obtaining a first image of the calibration phantom using the first device;
    performing a calibration on the first center of the first device based on the first image; and moving a reference center of the calibration phantom to the first center of the first device, before performing the calibration on the second center of the second device using the calibration phantom.

13. The method of claim 11, wherein the performing, based on the second center of the second device, a calibration on the second device includes:
obtaining a first offset between the second center and the first center; and
performing a mechanical adjustment on the second device based on the first offset to cause the second center to coincide with the first center.

14. The method of claim 12, wherein the performing, based on the second center of the second device, a calibration on the second device includes:
obtaining a second offset between the second center and the reference center of the calibration phantom; and
performing a mechanical adjustment on the second device based on the second offset to cause the second center to coincide with the first center.

15. The method of claim 11, wherein
the calibration phantom comprises one or more layers of coil arrays; and
the one or more layers of coil arrays are configured to obtain the magnetic flux variation of the second device in at least two gradient directions of the at least one gradient direction to facilitate the calibration of the second center of the gradient field domain of the second device in the at least two gradient directions.

16. The method of claim 15, wherein
at least one layer of coil array of the one or more layers of coil arrays includes a plurality of coils; and
the plurality of coils are arranged to form a flat combination.

17. The method of claim 16, wherein
the plurality of coils include at least a first coil and a second coil;
a size of the first coil is larger than a size of the second coil;
the first coil is distributed in an edge region of the at least one layer of coil array for calibrating a symmetry of a gradient field in the gradient field domain; and
the second coil is distributed in a central region of the at least one layer of coil array.

18. The method of claim 15, wherein
the calibration phantom includes a multi-layer of coil arrays arranged spaced apart from each other; and
two adjacent layers of coil arrays of the multi-layer of coil arrays are arranged opposite to each other.

19. The method of claim 15, wherein
at least one layer of coil array of the one or more layers of coil arrays includes a plurality of coils; and
the plurality of coils are arranged along a first gradient direction or a second gradient direction of the at least two gradient directions to facilitate the calibration on the second center of the gradient field domain in the first gradient direction or the second gradient direction.

20. A system for calibrating a medical device, the medical device including a magnetic resonance (MR) device, the system comprising:
at least one storage medium including a set of instructions;
at least one processor in communication with the at least one storage medium, wherein when executing the set of instructions, the at least one processor is directed to cause the system to perform operations including:
obtaining, by using a magnetic flux measurement component, a magnetic flux variation in at least one gradient direction in at least one portion of a spatial region within a gradient field domain of the MR device;
determining, based on the magnetic flux variation, a center of the gradient field domain of the MR device; and
performing, based on the center of the gradient field domain, a mechanical adjustment on the MR device to locate the center of the gradient field domain at a target position, or adjusting, based on the center of the gradient field domain, an image reconstruction process performed on data generated by the MR device to correct or eliminate an impact of inaccuracy of the center of the gradient field domain on an image reconstructed based on the data.

* * * * *